(12) United States Patent
Sato

(10) Patent No.: US 9,342,718 B2
(45) Date of Patent: May 17, 2016

(54) MEMORY DEVICE INCLUDING WIRELESS ANTENNA

(71) Applicant: KABUSHIKI KAISHA TOSHIBA, Minato-ku (JP)

(72) Inventor: Keisuke Sato, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/477,200

(22) Filed: Sep. 4, 2014

(65) Prior Publication Data

US 2015/0199546 A1 Jul. 16, 2015

Related U.S. Application Data

(60) Provisional application No. 61/927,195, filed on Jan. 14, 2014.

(51) Int. Cl.
| | |
|---|---|
| *G06K 7/10* | (2006.01) |
| *H04B 5/00* | (2006.01) |
| *G06F 3/00* | (2006.01) |
| *G06K 19/07* | (2006.01) |
| *G06K 19/077* | (2006.01) |

(52) U.S. Cl.
CPC .............. *G06K 7/10316* (2013.01); *G06F 3/00* (2013.01); *G06K 7/10297* (2013.01); *G06K 19/0723* (2013.01); *G06K 19/07769* (2013.01); *H04B 5/0031* (2013.01); *H04B 5/0056* (2013.01); *H04B 5/0037* (2013.01)

(58) Field of Classification Search
CPC ........... G06K 7/10316; G06K 7/10297; H04B 5/0031; H04B 5/0056
See application file for complete search history.

(56) References Cited

U.S. PATENT DOCUMENTS

| | | | |
|---|---|---|---|
| 7,515,938 B2 | 4/2009 | Ruotsalainen et al. | |
| 7,921,183 B2 | 4/2011 | Kawamura | |
| 8,265,695 B2 | 9/2012 | Borean et al. | |
| 2008/0281217 A1* | 11/2008 | Peterson | A61B 5/0006 600/523 |
| 2009/0239468 A1 | 9/2009 | He et al. | |
| 2010/0169548 A1* | 7/2010 | Kanda | G06K 17/00 711/103 |

FOREIGN PATENT DOCUMENTS

| | | |
|---|---|---|
| JP | 2004-265343 A | 9/2004 |
| JP | 2009-282614 A | 12/2009 |
| JP | 2010-67060 A | 3/2010 |
| JP | 2013-250864 A | 12/2013 |

OTHER PUBLICATIONS

Office Action mailed Dec. 1, 2015 in Japanese Patent Application No. 2014-186482 (with English Translation).

(Continued)

*Primary Examiner* — Kristy A Haupt
(74) *Attorney, Agent, or Firm* — Oblon, McClelland, Maier & Neustadt, L.L.P

(57) ABSTRACT

According to one embodiment, a memory device includes a memory, a first controller, a wireless antenna, a memory unit, and a second controller. The first controller controls the memory. The memory unit is capable of operating by the wireless antenna. The second controller is capable of operating by the wireless antenna, reads data from the memory unit when receiving a read instruction, and outputs the data using the wireless antenna.

20 Claims, 29 Drawing Sheets

(56) References Cited

OTHER PUBLICATIONS

Non-Patent Literature dated Apr. 9, 2012 and retrieved Nov. 17, 2015 http://k-tai.impress.co.jp/docs/column/stapa/20120409_525089.html.

Office Action issued Feb. 23, 2016 in Japanese Patent Application No. 2014-186482 (with English translation).

Non-Patent Literature dated Jun. 20, 2011 and retrieved Feb. 12, 2016 http://businessnetwork.jp/Detail/tabid/65/artid/1382/Default.aspx.

* cited by examiner

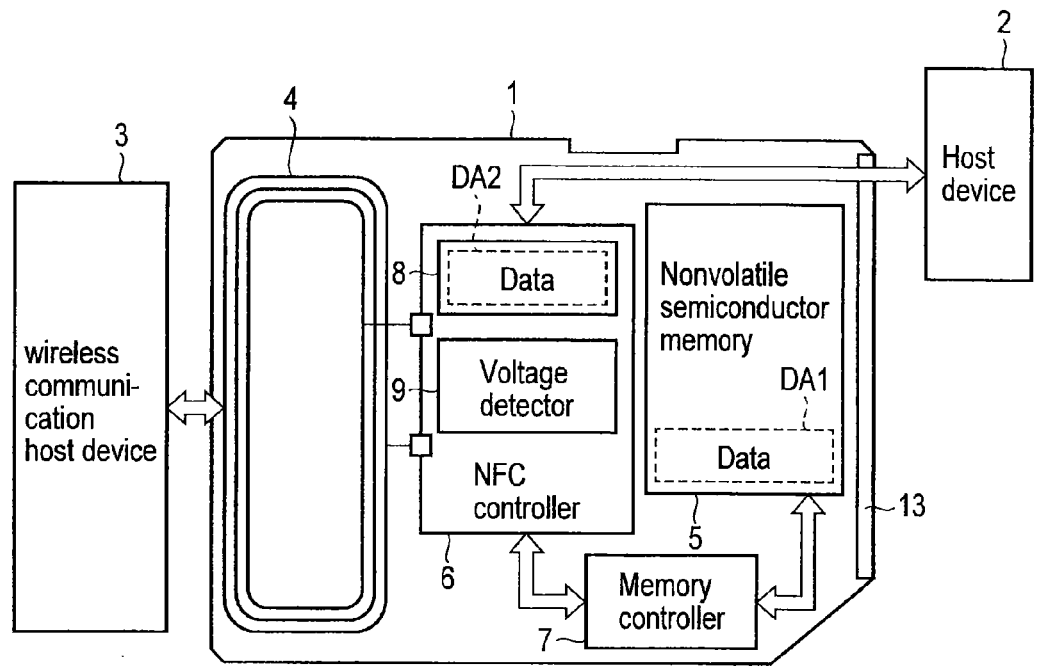
F I G. 1
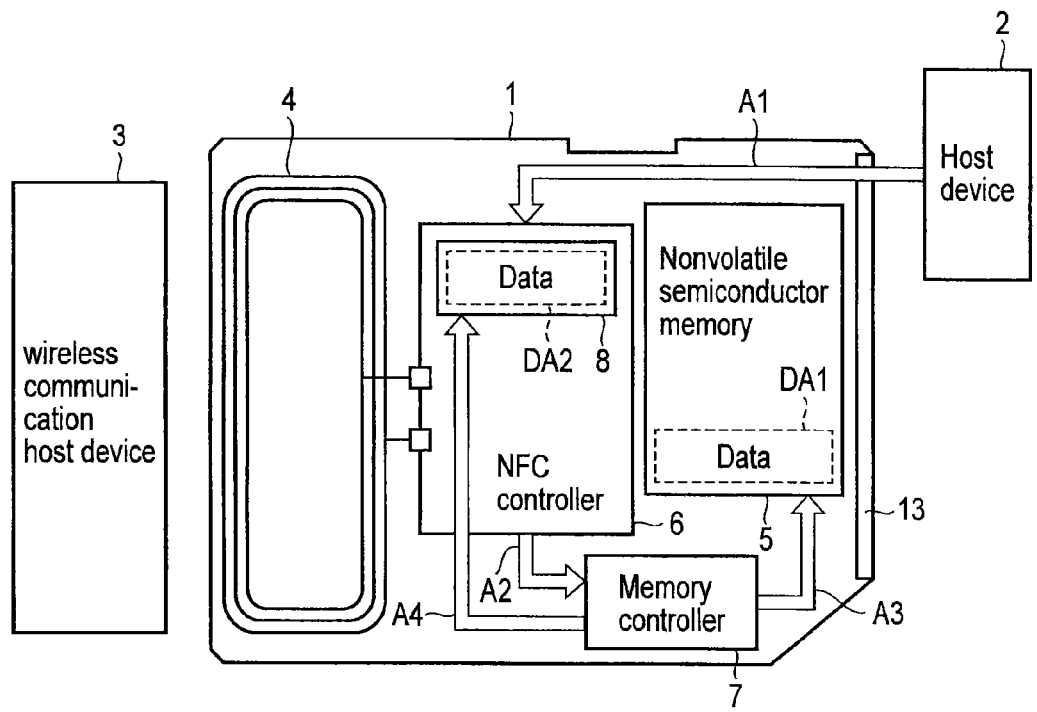
F I G. 2

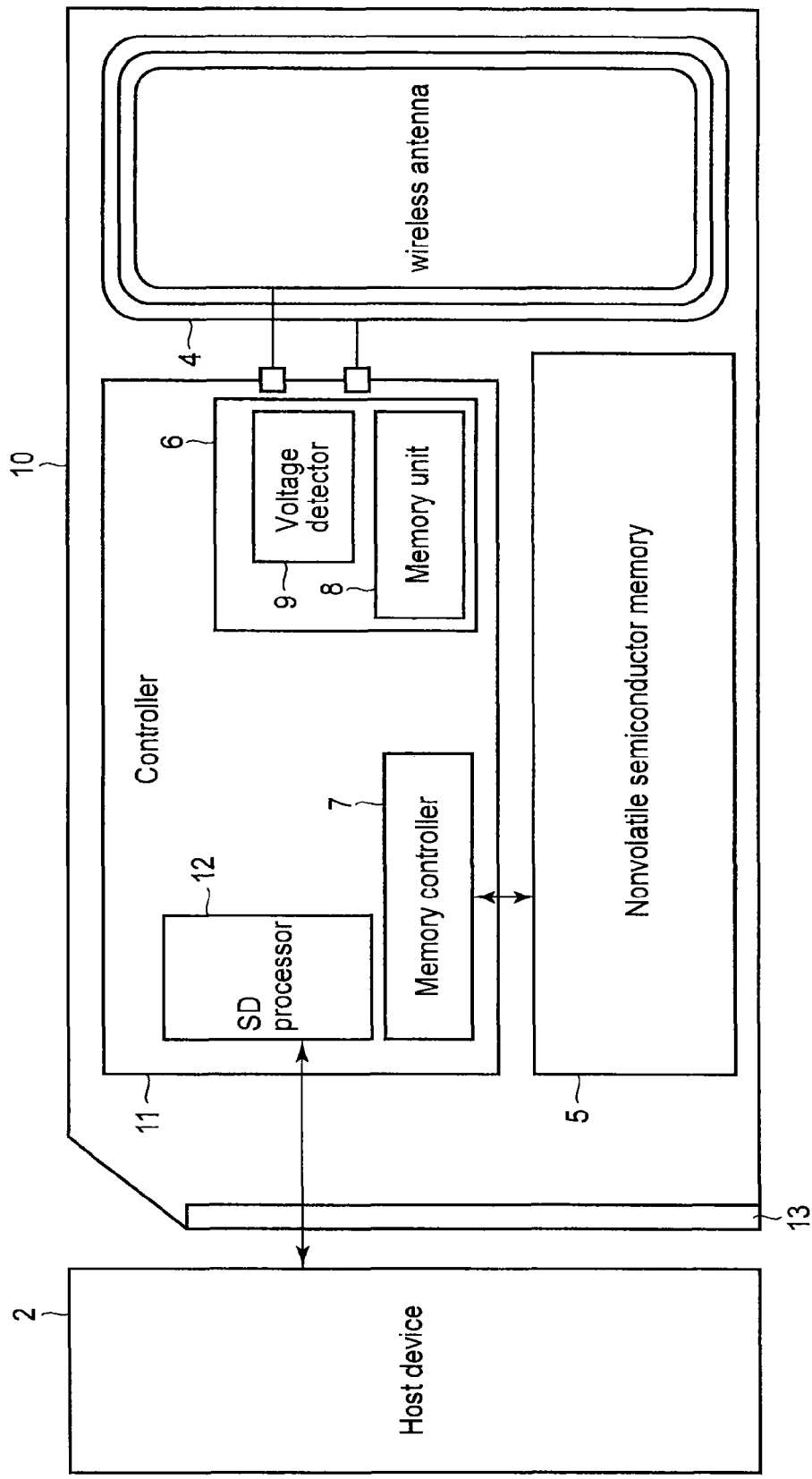
F I G. 14

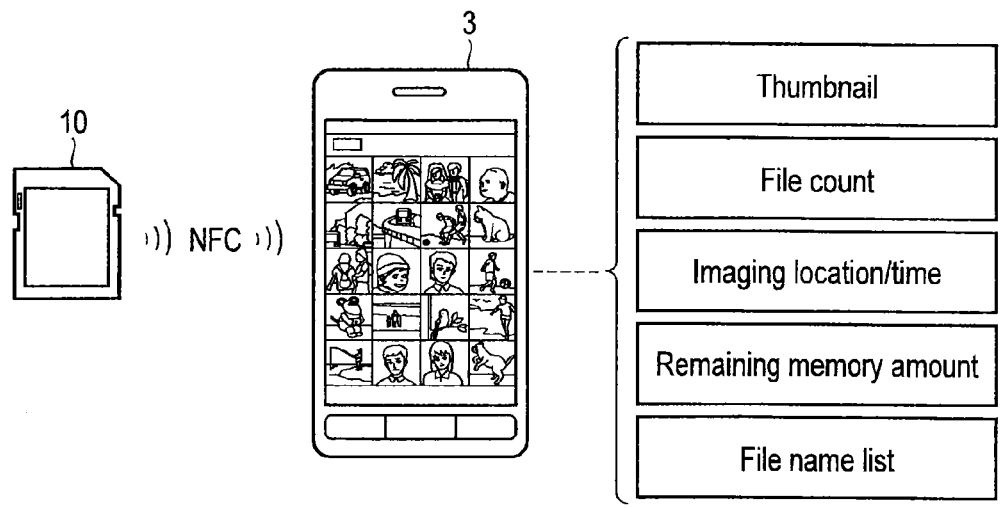
F I G. 1 5
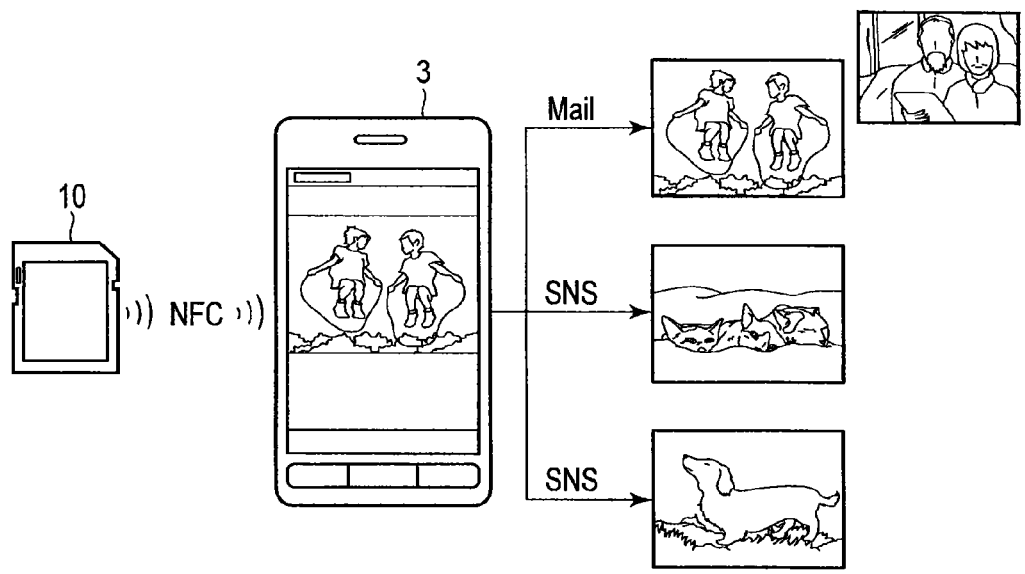
F I G. 1 6

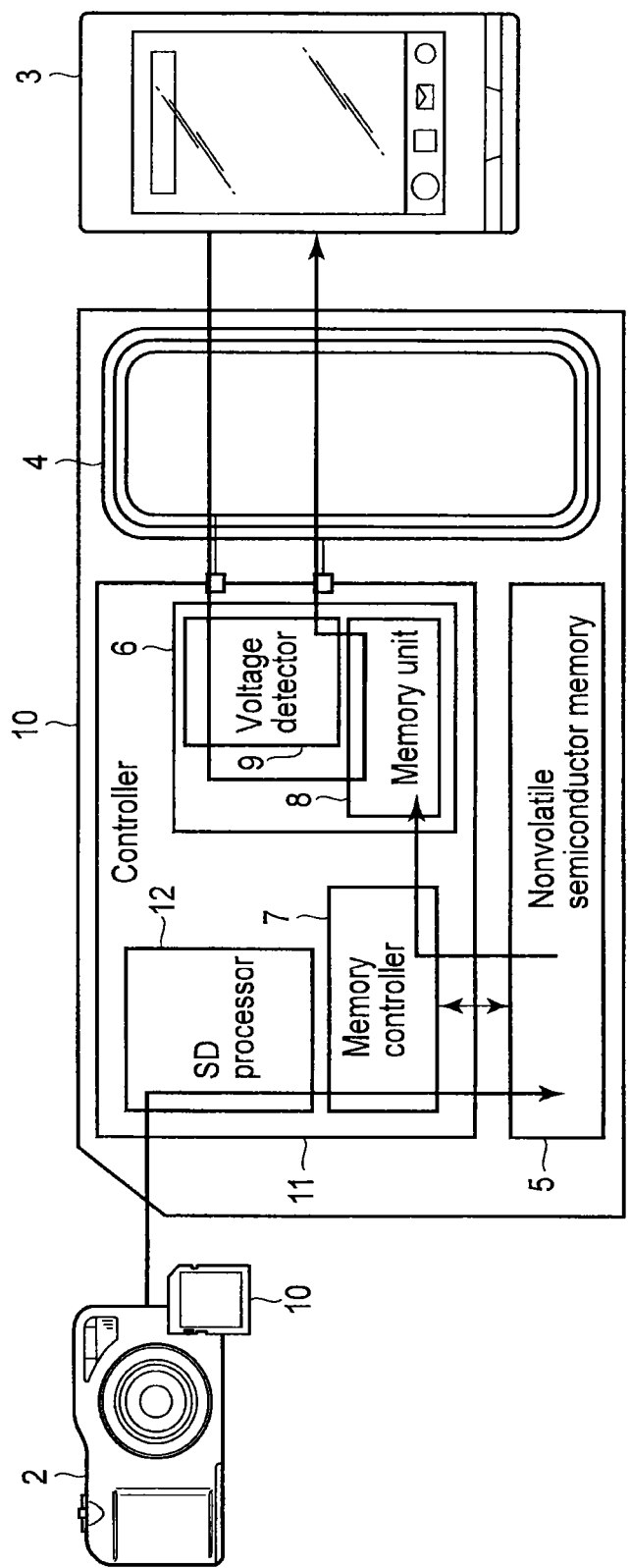
F I G. 1 8

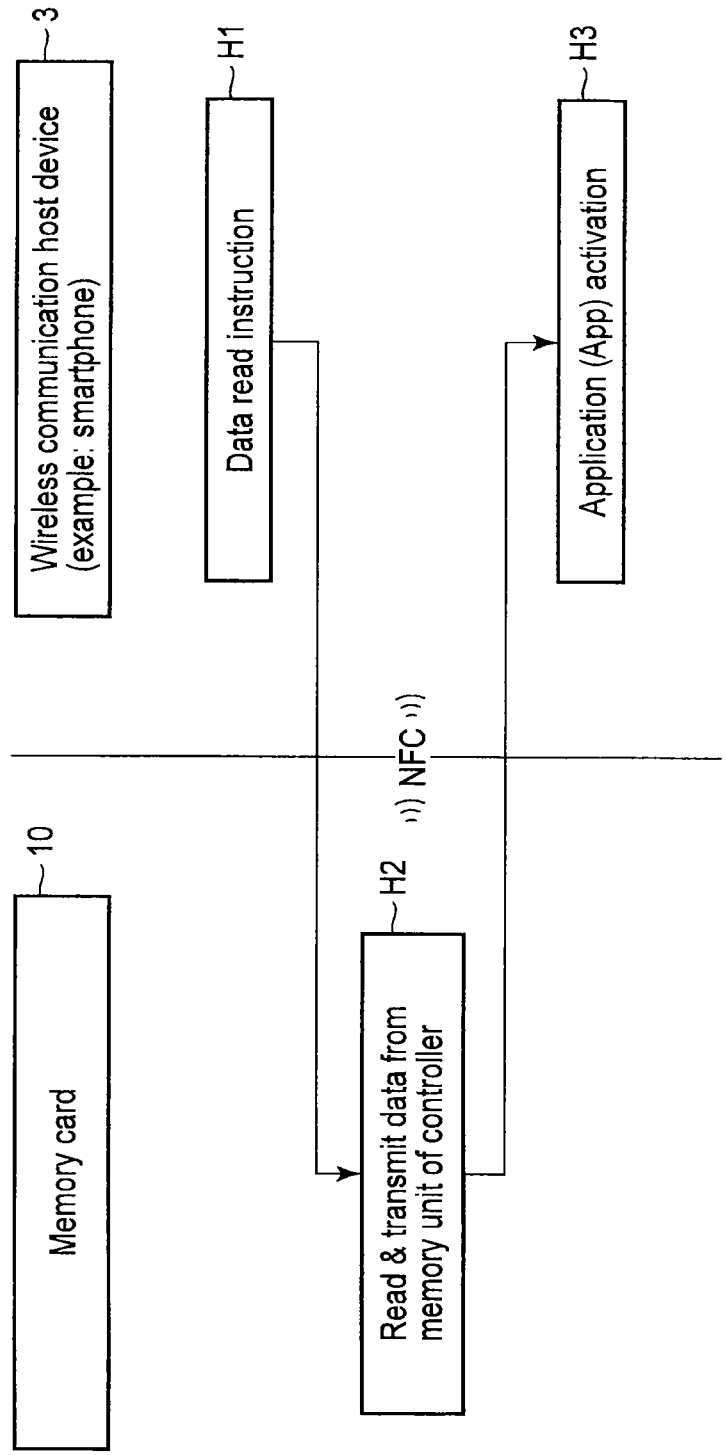
F I G. 19

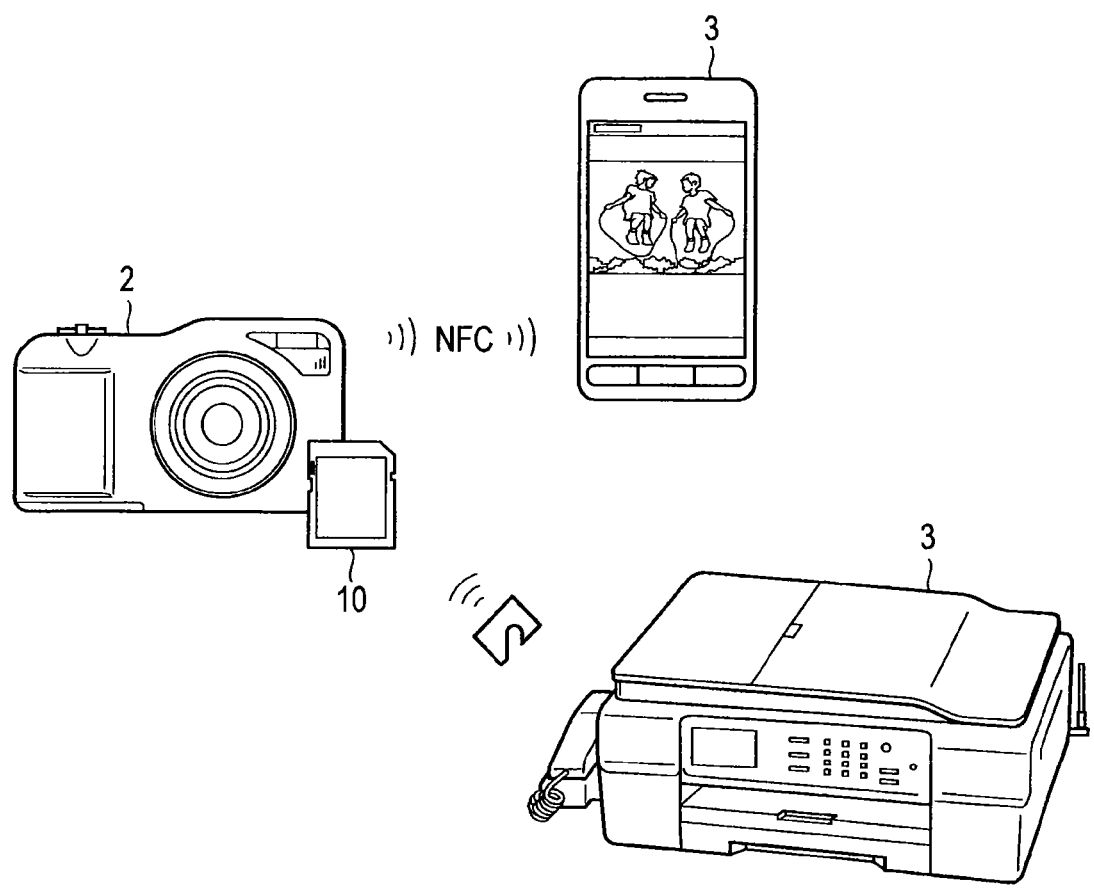
F I G. 2 2

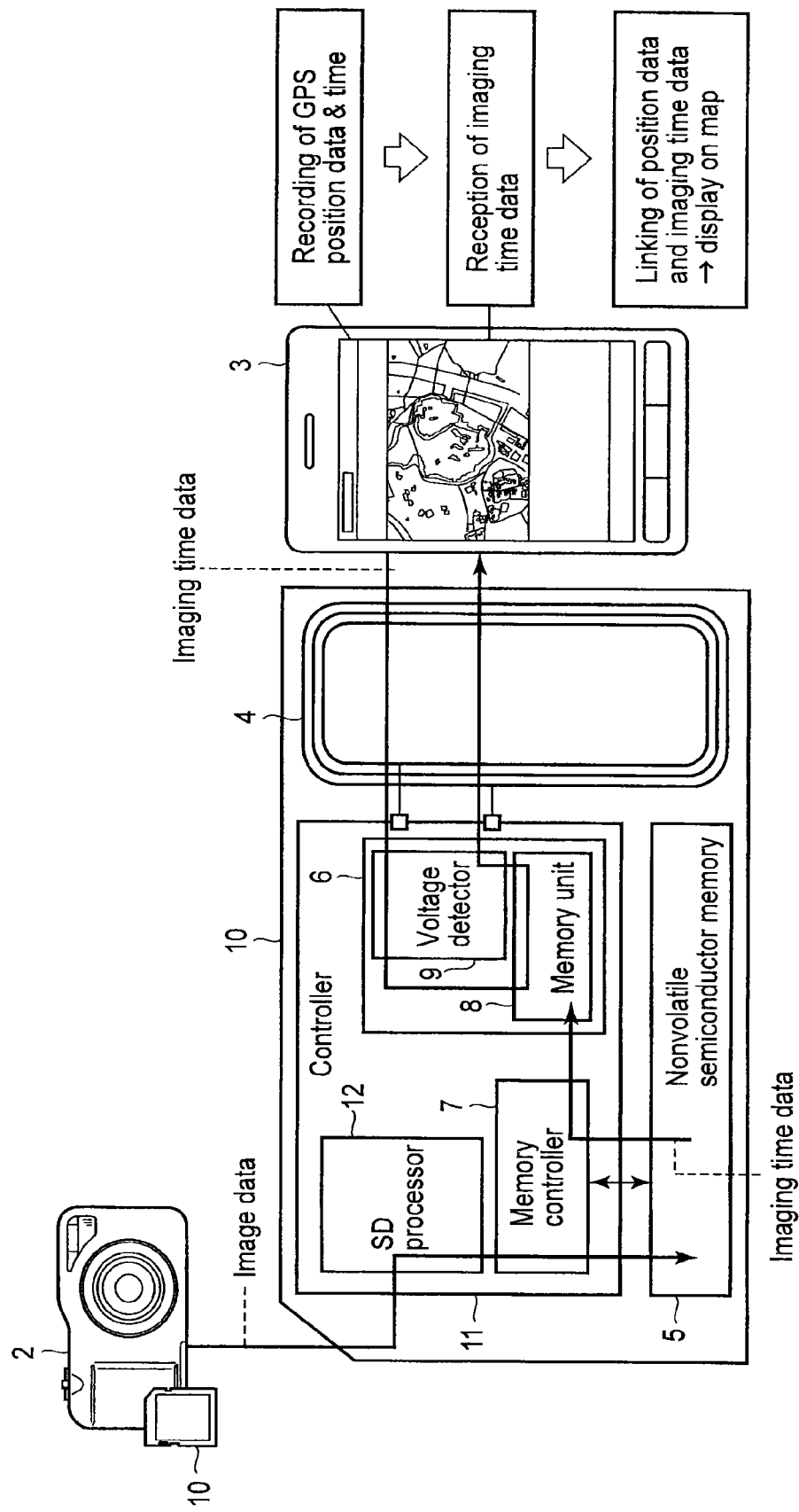
F I G. 26

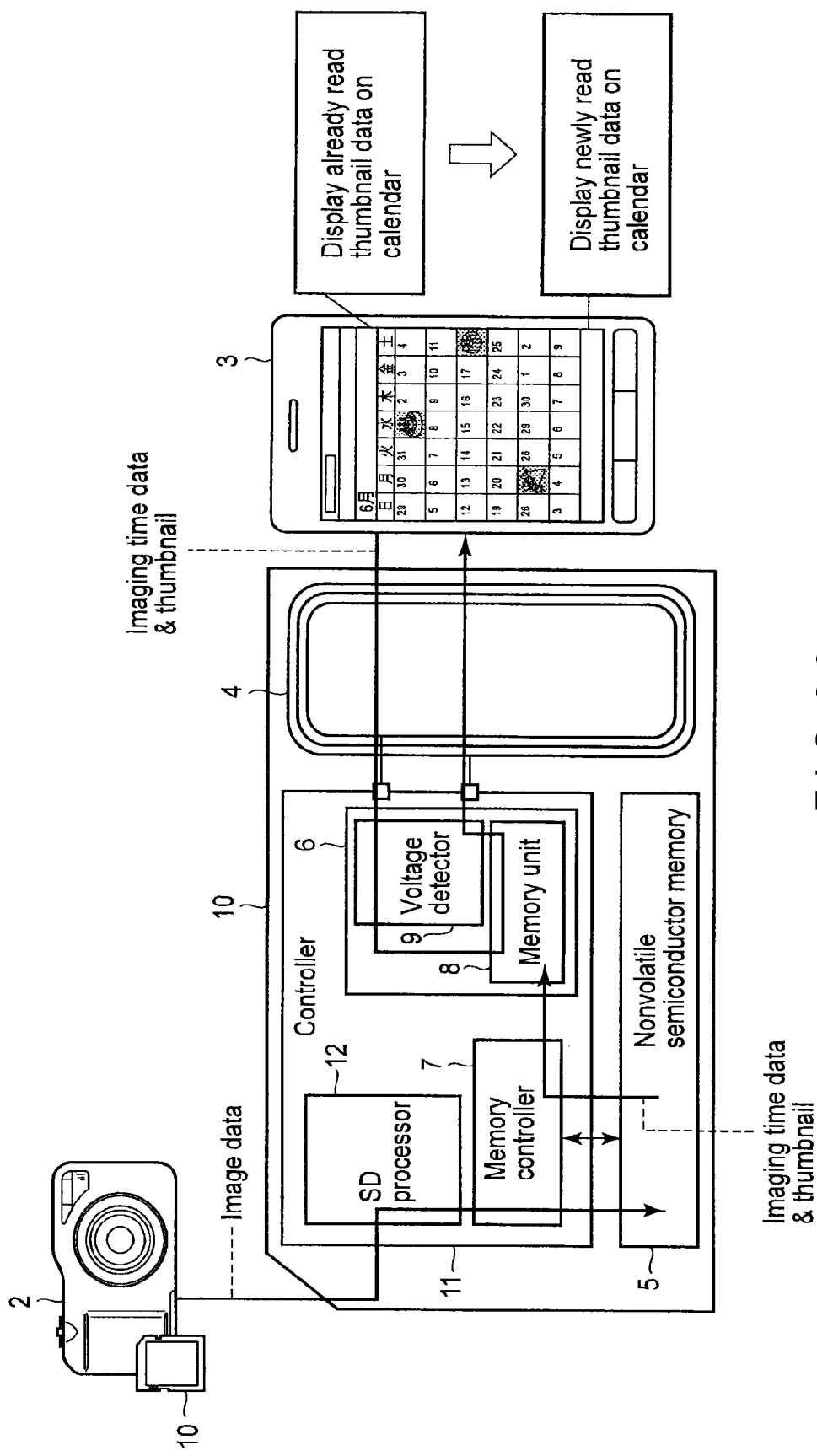
F I G. 28

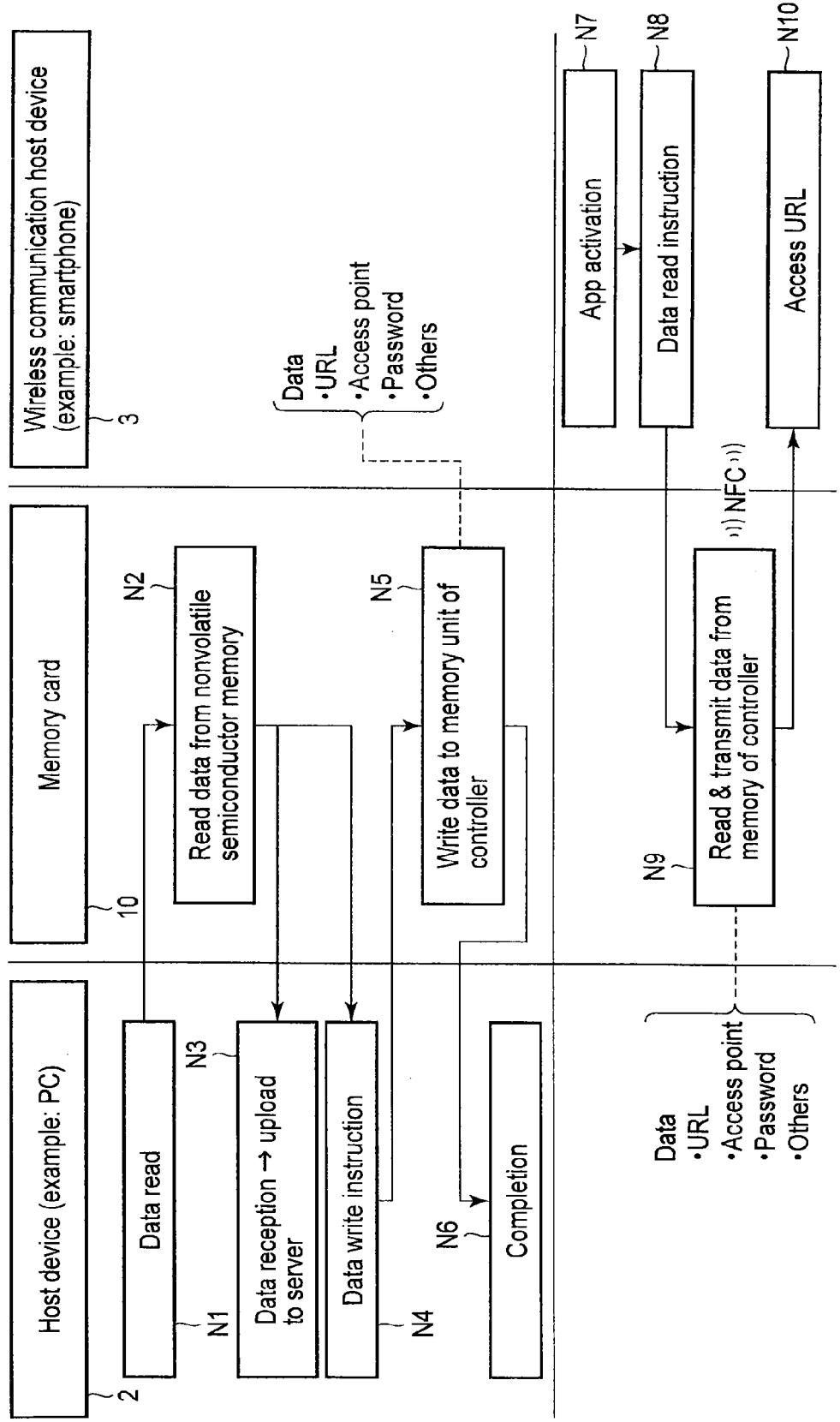
F I G. 31

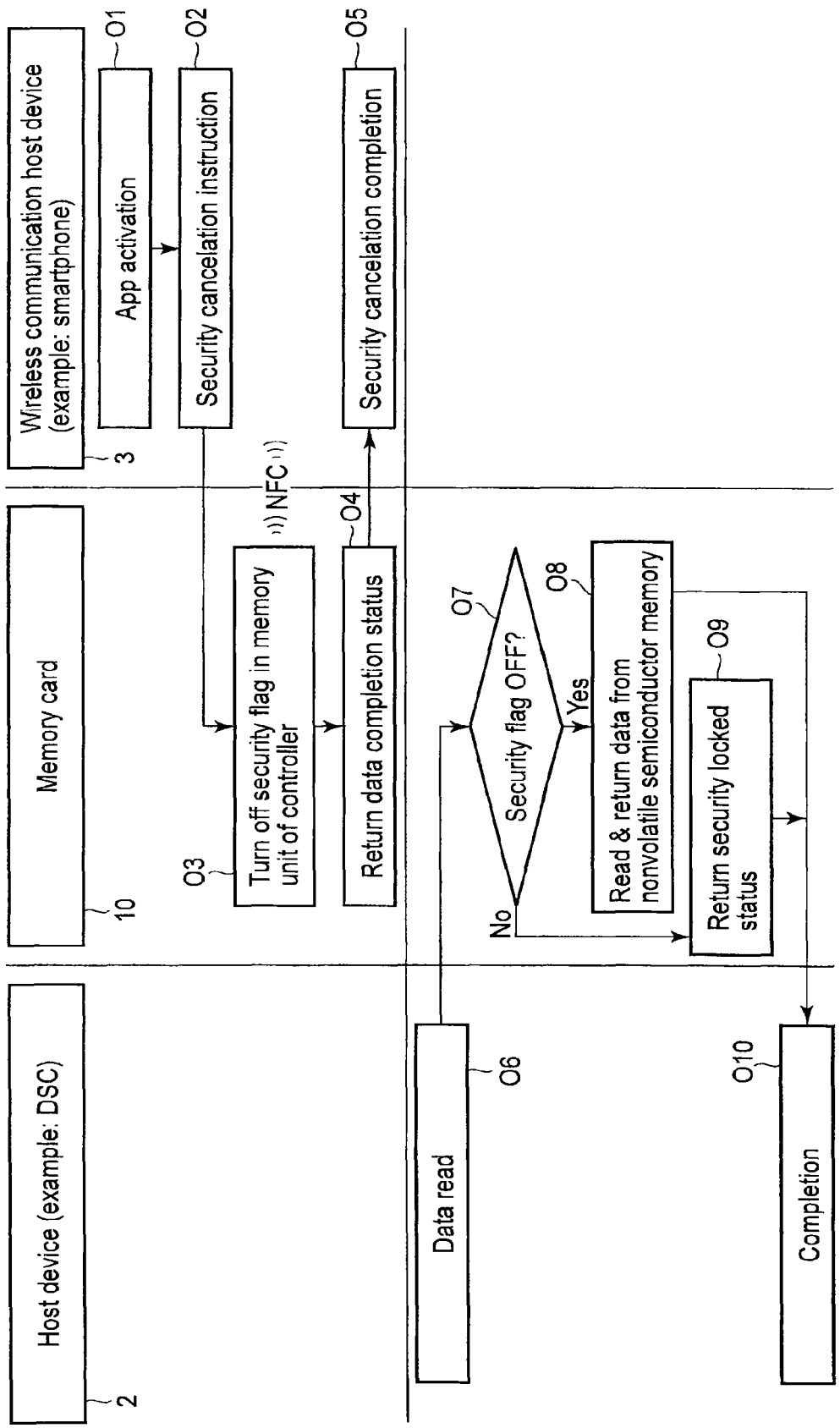
F I G. 32

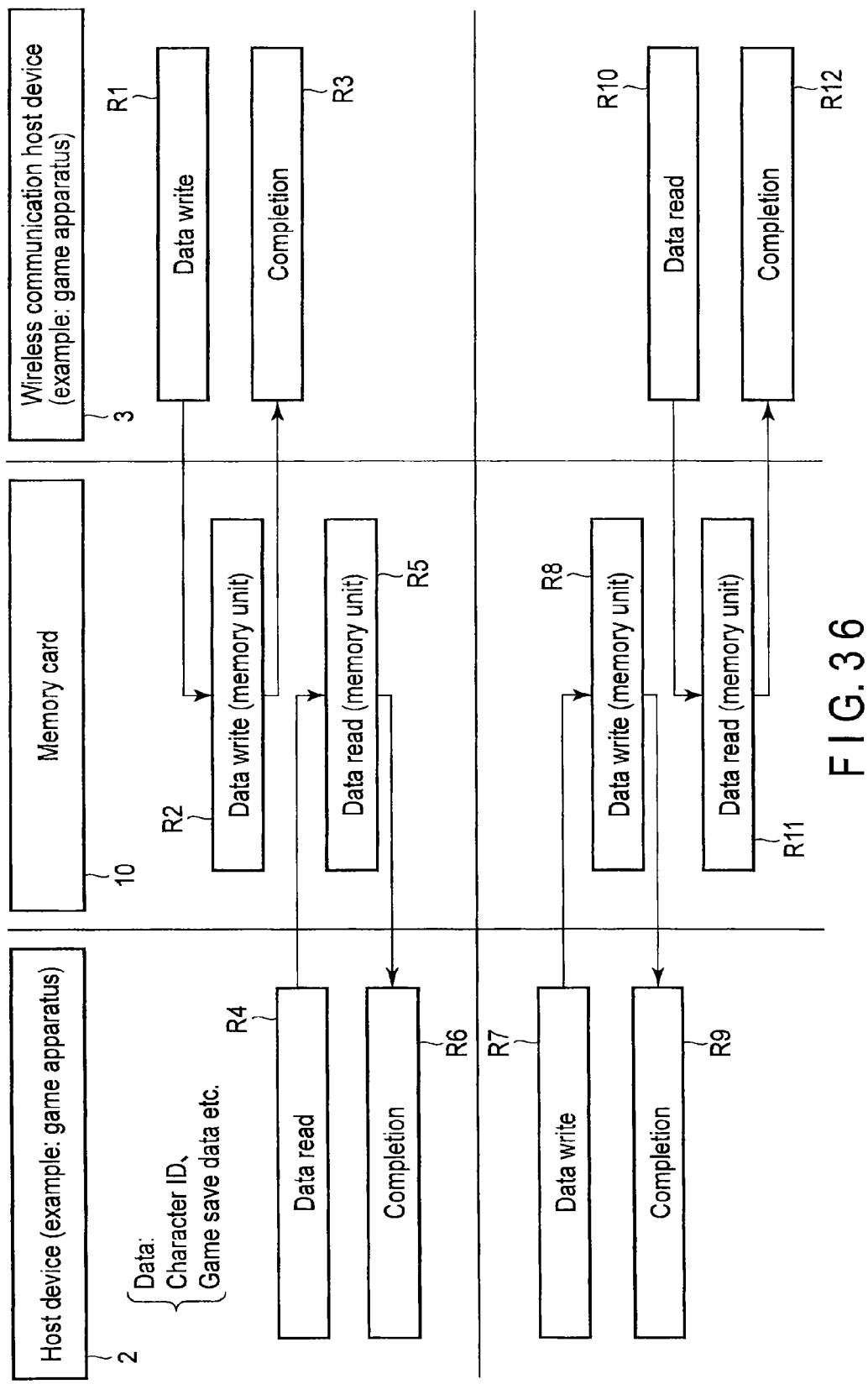
F I G. 3 6

MEMORY DEVICE INCLUDING WIRELESS ANTENNA

CROSS-REFERENCE TO RELATED APPLICATIONS

This application claims the benefit of U.S. Provisional Application No. 61/927,195, filed Jan. 14, 2014, the entire contents of which are incorporated herein by reference.

FIELD

Embodiments described herein relate generally to a memory device including a wireless antenna.

BACKGROUND

A memory card such as an SD memory card is an example of a memory device.

Generally, the memory card receives electric power supply from a host device such as a digital still camera (DSC). By using electric power supplied from this host device, the memory card can exchange data with the host device, and write data to and read data from a nonvolatile semiconductor memory.

To check data written to the memory card, a user must set the memory card in the host device.

Recently, users who purchase many memory cards and save obtained image data in these memory cards instead of saving the data in a backup destination such as a PC are increasing in number. When the number of memory cards to be used thus increases, it becomes difficult for the user to ascertain which data is stored in which memory card. The user must check data written to many memory cards by setting the memory cards in the host device, and reading the data from the memory cards.

BRIEF DESCRIPTION OF THE DRAWINGS

FIG. 1 is an exemplary block diagram showing an arrangement of a memory device according to a first embodiment;

FIG. 2 is an exemplary block diagram showing an operation in which data is automatically written to a memory unit by a memory controller;

FIG. 14 is an exemplary block diagram showing an outline of an arrangement of a memory card according to a second embodiment;

FIG. 15 is a view showing a first application example of the memory card according to the second embodiment;

FIG. 16 is a view showing a second application example of the memory card according to the second embodiment;

FIG. 18 is a block diagram showing the third application example of the memory card according to the second embodiment;

FIG. 19 is a flowchart showing a fourth application example of the memory card according to the second embodiment;

FIG. 22 is a view showing a sixth application example of the memory card according to the second embodiment;

FIG. 26 is a block diagram showing the eighth application example of the memory card according to the second embodiment;

FIG. 28 is a block diagram showing the ninth application example of the memory card according to the second embodiment;

FIG. 31 is a flowchart showing an eleventh application example of the memory card according to the second embodiment;

FIG. 32 is a flowchart showing a twelfth application example of the memory card according to the second embodiment;

FIG. 36 is a flowchart showing a sixteenth application example of the memory card according to the second embodiment.

DETAILED DESCRIPTION

Figure 3:
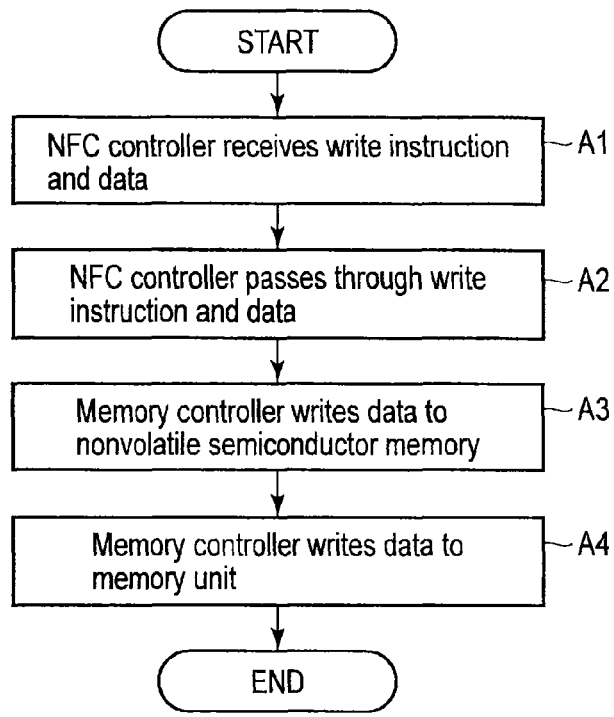
FIG. 3 is an exemplary flowchart showing the operation in which the data is automatically written to the memory unit by the memory controller.

Embodiments will be described hereinafter with reference to the drawing. In the following description, the same reference numerals denote components having nearly the same functions and arrangements, and a repetitive description thereof will be given if necessary.

In general, according to one embodiment, a memory device includes a memory, a first controller, a wireless antenna, a memory unit, and a second controller. The first controller controls the memory. The memory unit is capable of operating by the wireless antenna. The second controller is capable of operating by the wireless antenna, and reads data from the memory unit when receiving a read instruction, and outputs the data using the wireless antenna.

First Embodiment

In this embodiment, a memory device including a wireless antenna will be explained. As the memory device, various forms such as a memory card (for example, an SD memory card or multimedia card) or a USB memory can be applied. Note that the same structure as that of the memory device according to this embodiment may also be applied to a wireless communication device such as a cell phone. For example, the same structure as that of the memory device according to this embodiment may be applied to a memory system of an information processing device. The memory system includes at least a memory device and a controller for controlling the memory device.

FIG. 1 is an exemplary block diagram showing an arrangement of a memory device according to this embodiment.

A memory device 1 includes a function of writing data DA1 to and reading the data DA1 from an electrically connected host device 2 by electric power supplied from the host device 2, and a function of communicating data DA2 by electric power produced (induced) by an electromagnetic induction of a wireless antenna 4 although the memory device 1 is not electrically connected to a wireless communication host device 3. That is, the memory device 1 performs communication complying with a Near Field Communication (NFC) standard at a frequency such as 13.56 MHz, and transmits or receives the data DA2 to or from the wireless communication host device 3. The memory device 1 can operate without receiving any electric power supply from the host device 2.

The memory device 1 exchanges the data DA1 with the host device 2 in accordance with, for example, an SD interface, but another interface may also be used. Also, the memory device 1 exchanges the data DA2 with the wireless communication host device 3 in accordance with, for example, an NFC interface, but another wireless communication interface may also be used.

The host device 2 and wireless communication host device 3 are separate devices in this embodiment, but they may also be an integrated device.

The memory device 1 includes the wireless antenna 4, a nonvolatile semiconductor memory 5, an NFC controller 6, a memory controller 7, and a connecting unit 13. The NFC controller 6 includes a memory unit 8 and voltage detector 9. Note that the NFC controller 6 and memory unit 8 may also be separate units. The NFC controller 6 and memory controller 7 may also be implemented by a single controller.

The nonvolatile semiconductor memory 5 is, for example, a NAND type flash memory. However, it is also possible to use another nonvolatile semiconductor memory such as a NOR type flash memory, magnetoresistive random access memory (MRAM), phase-change random access memory (PRAM), resistive random access memory (ReRAM), or ferroelectric random access memory (FeRAM). For example, the nonvolatile semiconductor memory 5 may be changed into a memory such as the other nonvolatile memory, a volatile memory, a magnetic memory, or the like.

The memory controller 7 controls the nonvolatile semiconductor memory 5. For example, the memory controller 7 writes the data DA1 to the nonvolatile semiconductor memory 5 when receiving a write instruction and the data DA1 from the host device 2. The memory controller 7 reads the data DA1 from the nonvolatile semiconductor memory 5 when receiving a read instruction. The memory controller 7 may write the data DA1 to the nonvolatile semiconductor memory 5 when receiving power supply from the host device 2 and receiving a write instruction and the data DA1 from the host device 2 via the wireless antenna 4 and NFC controller 6.

The memory controller 7 may write the data DA2 to the memory unit 8 when receiving a write instruction, and read the data DA2 from the memory unit 8 when receiving a read instruction.

The memory controller 7 may read the data DA1 from the nonvolatile semiconductor memory 5 when receiving a read instruction, and output the data DA1 via the NFC controller 6 and wireless antenna 4.

The nonvolatile semiconductor memory 5 and memory controller 7 operate by electric power supplied from the host device 2.

The wireless antenna 4 is set at a predetermined frequency or frequency band corresponding to NFC.

Also, the wireless antenna 4 produces electric power by the electromagnetic induction based on a radio wave from the wireless communication host device 3. The wireless antenna 4 supplies the produced electric power to the NFC controller 6. In addition, the wireless antenna 4 receives data from the wireless communication host device 3, and outputs the received data to the NFC controller 6. Furthermore, the wireless antenna 4 outputs the data DA2 from the NFC controller 6 to the wireless communication host device 3. The wireless antenna 4 is, for example, a PCB pattern antenna.

The NFC controller 6 operates by electric power produced in the wireless antenna 4 by the electromagnetic induction based on the radio wave from the wireless communication host device 3. The NFC controller 6 reads the data DA2 from the memory unit 8 when operating or receiving a read instruction via the wireless antenna 4 from the wireless communication host device 3, and outputs the data DA2 using the wireless antenna 4 to the wireless communication host device 3. Likewise, the NFC controller 6 may also write the data DA2 to the memory unit 8 when operating or receiving a write instruction and the data DA2 using the wireless antenna 4. The NFC controller 6 controls data transmission and reception with respect to the wireless communication host device 3 by using the wireless antenna 4. More specifically, the NFC controller 6 becomes capable of communication by NFC when receiving a signal having a predetermined frequency corresponding to NFC via the wireless antenna 4.

Furthermore, when writing to the nonvolatile semiconductor memory 5, the NFC controller 6 outputs a write instruction and the data DA1 received from the host device 2 via the connecting unit 13 to the memory controller 7. The NFC controller 6 may output a write instruction and the data DA1 to the memory controller 7 when receiving the write instruction and the data DA1 from the host device 2 via the connecting unit 13, and write the data DA2 to the memory unit 8.

Also, when reading from the nonvolatile semiconductor memory 5, the NFC controller 6 outputs the data DA1 received from the memory controller 7 to the host device 2 via the connecting unit 13.

The voltage detector 9 of the NFC controller 6 is electrically connected to the wireless antenna 4, and monitors a voltage to be supplied from the wireless antenna 4 to the NFC controller 6, and keeps outputting a reset signal for communication by NFC until a predetermined voltage corresponding to NFC is obtained. This makes it possible to prevent an abnormal activation or operation of communication by NFC.

When receiving power supply from the host device 2 and receiving a write instruction and the data DA1 from the host device 2, the NCF controller 6 may write the data DA1 received from the host device 2 to the nonvolatile semiconductor memory 5. The NCF controller 6 may write data to the nonvolatile semiconductor memory 5 when receiving power supply from the host device 2 and receiving a write instruction and the data by NFC via the wireless antenna 4 and the NFC controller 6.

When receiving power supply from the host device 2 and receiving a generating instruction of the data 2 from the host device 2, the NFC controller 6 may produce the data DA2 by reading the data DA1 written to the nonvolatile semiconductor memory 5, and write the data DA2 to the memory unit 8.

When receiving power supply from the host device 2 and receiving a wireless output instruction, the NFC controller 6 may read a part or the whole of the data DA1 written to the nonvolatile semiconductor memory 5, and output the read data to the wireless communication host device 3 via the wireless antenna 4.

The NFC controller 6 may write instruction data to the memory unit 8 when receiving the instruction data and a write instruction using the wireless antenna 8, and perform a process indicated by the instruction data written to the memory unit 8 when receiving an performing instruction.

The memory unit 8 is, for example, a nonvolatile memory. The memory unit 8 writes the data DA2 according to a control of the NFC controller 6 or memory controller 7. Note that the memory unit 8 may also temporarily save the data DA2. Although an electrically erasable programmable read-only memory (EEPROM) or the like is used as the memory unit 8, various memories can be used in the same manner as for the nonvolatile semiconductor memory 5.

The data DA2 may be, for example, data to be exchanged between the wireless communication host device 3 and memory device 1 in accordance with an NFC interface, feature data of the data DA1 to be written to the nonvolatile semiconductor memory 5, feature data received from the wireless communication host device 3 to the NFC controller 6 via the wireless antenna 4, feature data concerning the nonvolatile semiconductor memory 5, or feature data concerning the memory device 1. More specifically, the feature data DA2 may be a part of image data to be written to the nonvolatile semiconductor memory 5 (for example, a start or end portion of the image data, or thumbnail data of the image data), management information of the data DA1 to be written to the nonvolatile semiconductor memory 5, a memory capacity of the nonvolatile semiconductor memory 5, a remaining capacity of the nonvolatile semiconductor memory 5, a name of a file written to the nonvolatile semiconductor memory 5, a production time of the data DA1, imaging time data when the data DA1 is image data, or the number of files written to the nonvolatile semiconductor memory 5.

The NFC controller 6 and memory unit 8 operate by electric power induced in the wireless antenna 4 by the wireless communication host device 3. Therefore, the NFC controller 6 and memory unit 8 are desirably drivable by electric power lower than that of the memory controller 7 and nonvolatile semiconductor memory 5. When electric power is supplied from the host device 2 to the memory device 1, however, the NFC controller 6 and memory unit 8 may operate by electric power supplied from the host device 2.

In this embodiment, a write instruction and data from the host device 2 are first received by the NFC controller 6, and then received by the memory controller 7. This is so because the NFC controller 6 first determines whether the write instruction and data are received from the host device 2 or wireless communication host device 3, and switches operations in accordance with the determination result.

The connecting unit 13 is, for example, a standardized connecting terminal, and connectable to the host device 2.

Various operations of the memory device 1 according to this embodiment will be explained below with reference to FIGS. 2, 3, 4, 5, 6, 7, 8, 9, 10, 11, 12, and 13.

As a first operation, an operation example in which the memory controller 7 automatically writes the data DA2 to the memory unit 8 will be explained with reference to a block diagram in FIG. 2 and a flowchart in FIG. 3. FIGS. 2 and 3 show an operation example in which the memory device 1 receives the data DA1 from the host device 2.

In step A1, the NFC controller 6 receives a write instruction and the data DA1 from the host device 2.

In step A2, the NFC controller 6 passes through the write instruction and the data DA1, and the memory controller 7 receives the write instruction and data DA1.

In step A3, the memory controller 7 writes the data DA1 to the nonvolatile semiconductor memory 5.

In step A4, the memory controller 7 writes the data DA2 to the memory unit 8.

Figure 4:
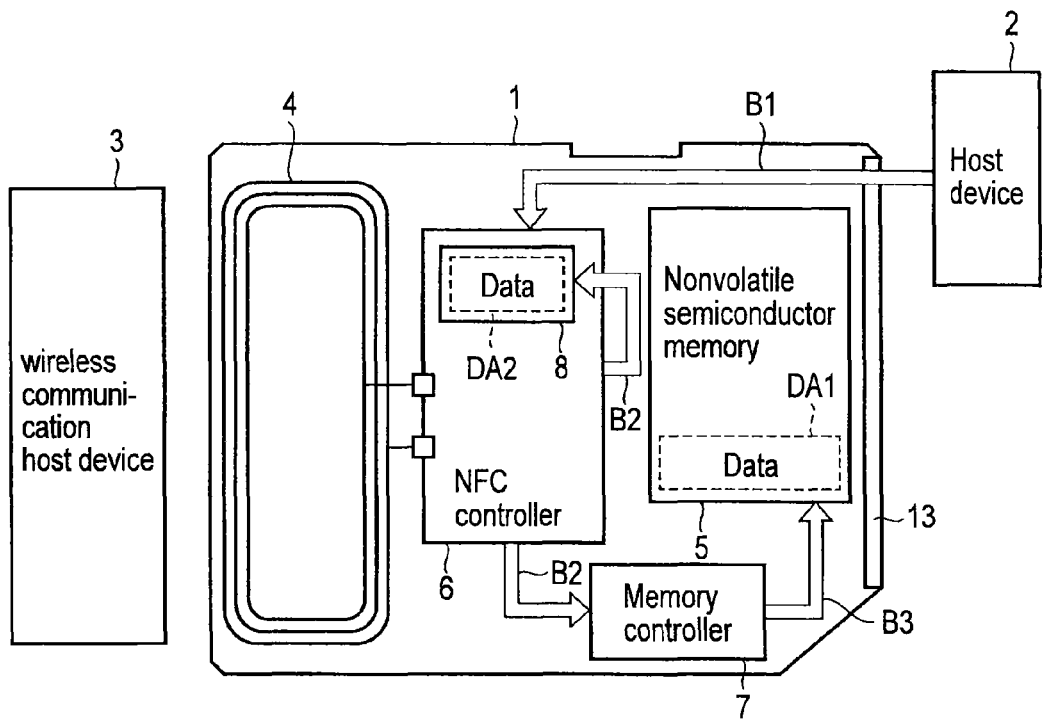
FIG. 4 is an exemplary block diagram showing an operation in which data is automatically written to a memory unit by an NFC controller.
Figure 5:
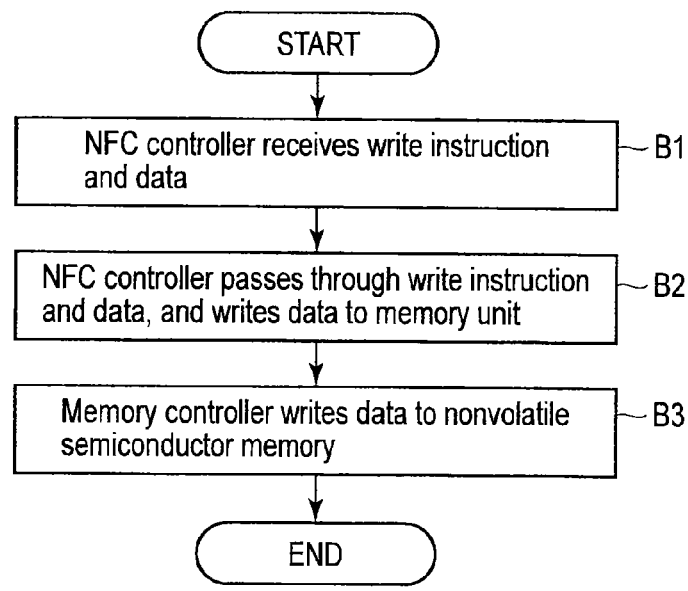
FIG. 5 is an exemplary flowchart showing the operation in which the data is automatically written to the memory unit by the NFC controller.

As a second operation, an operation example in which the NFC controller 6 automatically writes the data DA2 to the memory unit 8 will be explained with reference to a block diagram in FIG. 4 and a flowchart in FIG. 5. The difference of FIGS. 4 and 5 from FIGS. 2 and 3 in which the memory controller 7 writes the data DA2 to the memory unit 8 is that the NFC controller 6 writes the data DA2 to the memory unit 8.

In step B1, the NFC controller 6 receives a write instruction and the data DA1 from the host device 2.

In step B2, the NFC controller 6 passes through the write instruction and the data DA1 to the memory controller 7, and writes the data DA2 to the memory unit 8.

In step B3, the memory controller 7 writes the data DA1 to the nonvolatile semiconductor memory 5.

Figure 6:
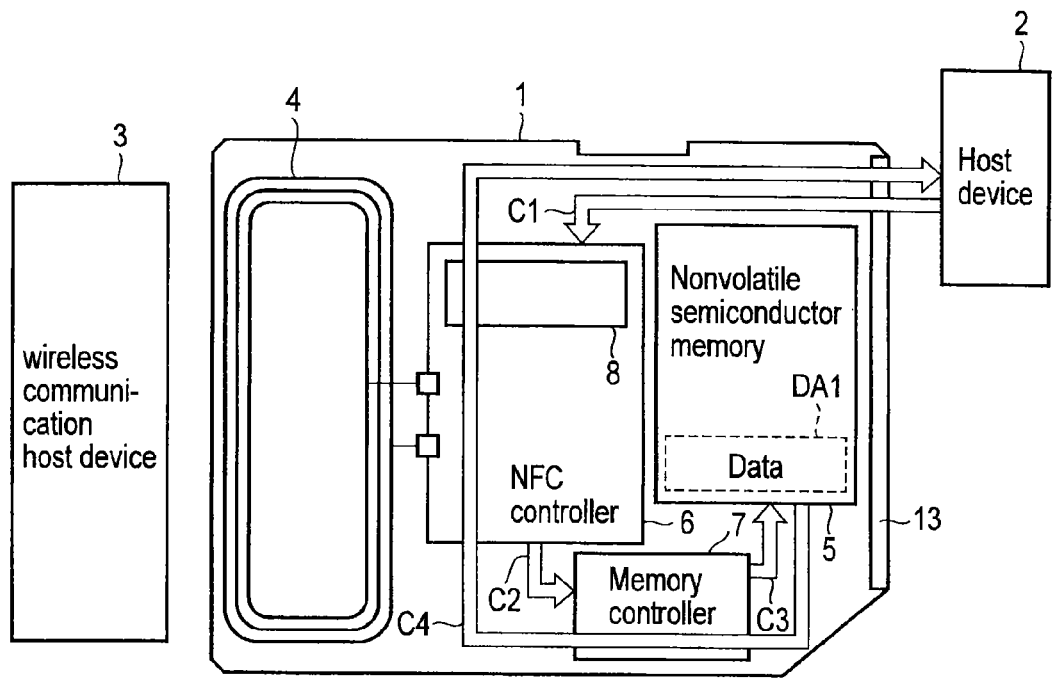
FIG. 6 is an exemplary block diagram showing an operation in which data is read from a nonvolatile semiconductor memory of the memory device.
Figure 7:
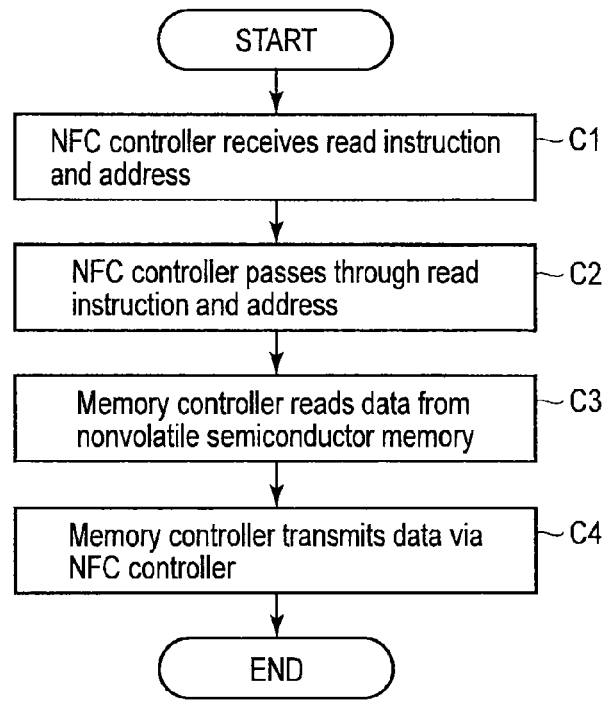
FIG. 7 is an exemplary flowchart showing the operation in which the data is read from the nonvolatile semiconductor memory of the memory device.

As a third operation, an operation example in which the data DA1 is read from the nonvolatile semiconductor memory 5 of the memory device 1 will be explained with reference to a block diagram in FIG. 6 and a flowchart in FIG. 7.

In step C1, the NFC controller 6 receives a read instruction and address from the host device 2. Note that the NFC controller 6 can also read data from the memory unit 8 in the next step based on the read instruction and address from the host device 2.

In step C2, the NFC controller 6 passes through the read instruction and address, and the memory controller 7 receives the read instruction and address.

In step C3, the memory controller 7 reads the data DA1 from the nonvolatile semiconductor memory 5 based on the read instruction and address.

In step C4, the memory controller 7 transmits the data DA1 to the host device 2 via the NFC controller 6.

As a fourth operation, an operation example in which the wireless communication host device 3 reads the data DA2 from the memory unit 8 will be explained with reference to a block diagram in FIG. 8 and a flowchart in FIG. 9.

In step D1, the NFC controller 6 receives a read instruction from the wireless communication host device 3 via the wireless antenna 4.

In step D2, the NFC controller 6 reads the data DA2 from the memory unit 8 based on the read instruction.

In step D3, the NFC controller 6 transmits the data DA2 to the wireless communication host device 3 via the wireless antenna 4.

Figure 8:
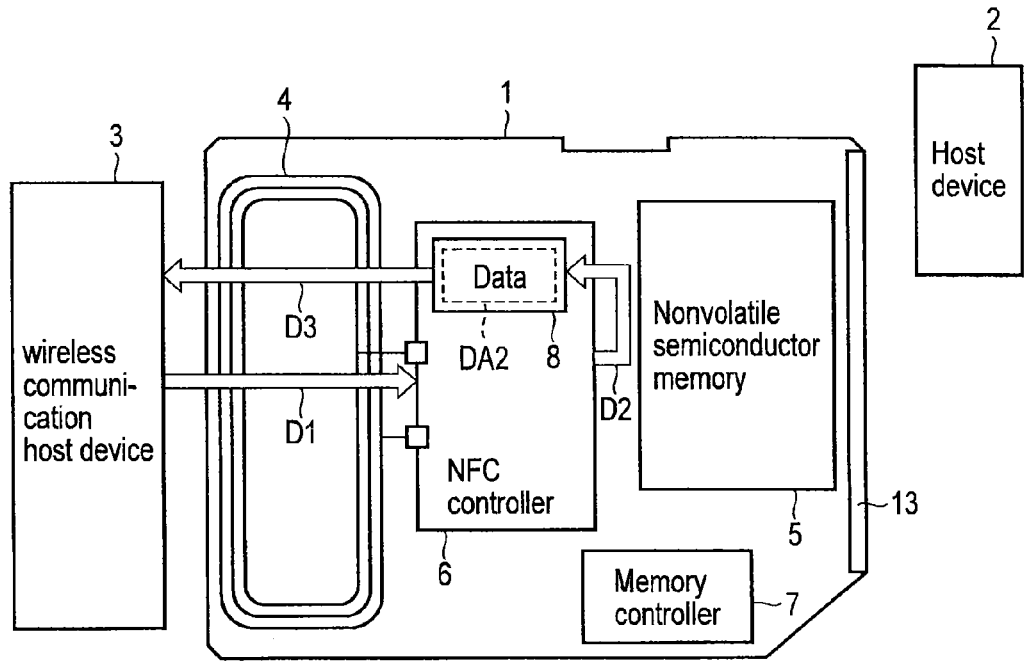
FIG. 8 is an exemplary block diagram showing an operation in which a wireless communication host device reads data from the memory unit.
Figure 9:
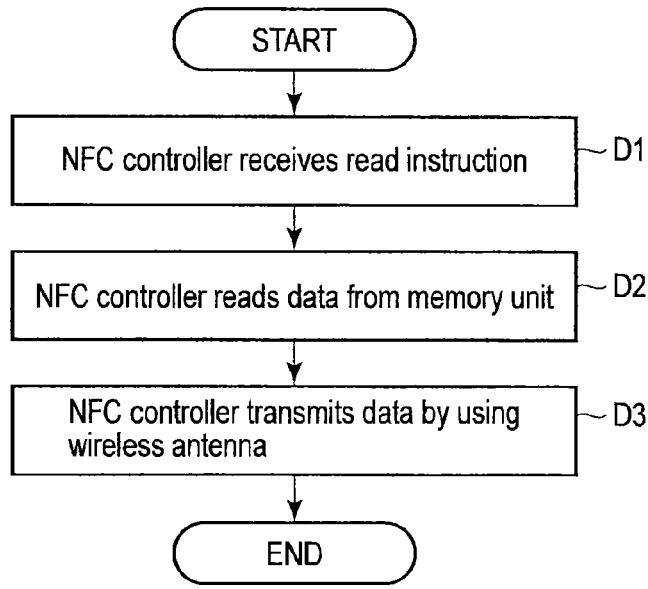
FIG. 9 is an exemplary flowchart showing the operation in which the wireless communication host device reads the data from the memory unit.

In this operation shown in FIGS. 8 and 9 in which the wireless communication host device 3 reads the data DA2, the host device 2 need not supply any electric power to the memory device 1. For example, the data DA2 is image data obtained by a digital still camera and finally written to the memory device 1. The wireless communication host device 3 can receive the image data written to the memory unit 8 from the memory device 1 without connecting the memory device 1 to the host device 2. In a general memory card, it is necessary to supply electric power to read internal data. In the memory device 1 according to this embodiment, however, internal data can be read by only holding the memory device 1 over (close to) the wireless communication host device 3.

Figure 10:
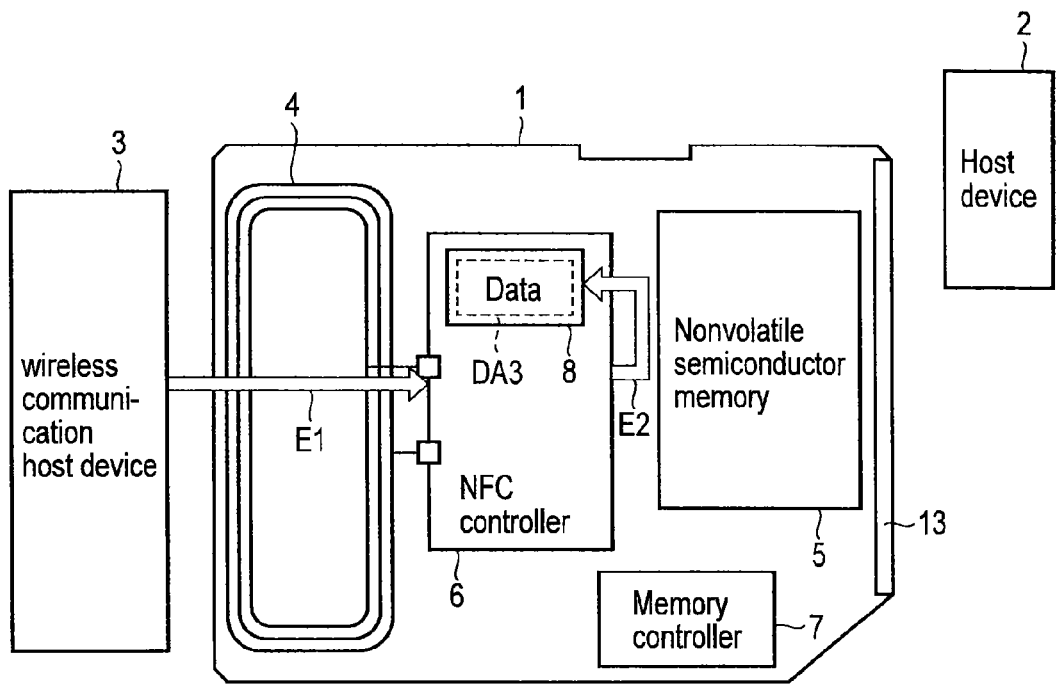
FIG. 10 is an exemplary block diagram showing an operation in which the memory device writes data from the wireless communication host device to the memory unit.
Figure 11:
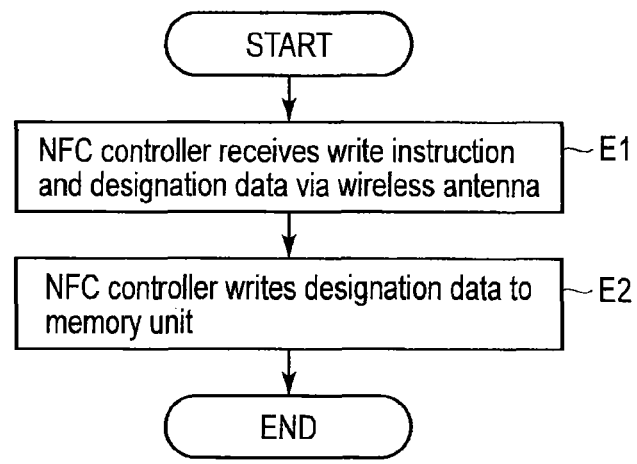
FIG. 11 is an exemplary flowchart showing the operation in which the memory device writes the data from the wireless communication host device to the memory unit.

As a fifth operation, an operation example in which the memory device 1 writes data from the wireless communication host device 3 to the memory unit 8 will be explained with reference to a block diagram in FIG. 10 and a flowchart in FIG. 11.

Note that FIGS. 10 and 11 will be explained by taking an example in which designation data DA3 for designating what data DA2 is to be written to the memory unit 8 is transmitted from the wireless communication host device 3 to the memory device 1, and written to the memory unit 8. However, the data to be transmitted from the wireless communication host device 3 to the memory device 1 may also be another data such as the data DA2 to be written to the memory unit 8, or security-related data. This operation shown in FIGS. 10 and 11 is executable even when the host device 2 supplies no electric power.

In step E1, the NFC controller 6 receives a write instruction and the designation data DA3 from the wireless communication host device 3 via the wireless antenna 4.

In step E2, the NFC controller 6 writes the designation data DA3 to the memory unit 8.

After that, the NFC controller 6 or memory controller 7 refers to the memory unit 8, reads the data DA2 designated by the designation data DA3 from the nonvolatile semiconductor memory 5, and writes the data DA2 to the memory unit 8. Alternatively, the NFC controller 6 or memory controller 7 selects the data DA2 designated by the designation data DA3 from the data DA1 received from the host device 2, and writes the data DA2 to the memory unit 8.

Consequently, a user can explicitly designate the data DA2 to be written to the memory unit 8.

For example, the designation data DA3 may includes data indicating whether to protect the data DA2 written to the memory unit 8. The designation data DA3 may also includes data number of the data DA2 to be written to the memory unit 8.

As a sixth operation, an operation example in which the NFC controller 6 determines whether to protect the data DA2 written to the memory unit 8 will be explained with reference to a block diagram in FIG. 12 and a flowchart in FIG. 13.

In step F1, the NFC controller 6 receives a write instruction and the data DA1 from the host device 2.

In step F2, the NFC controller 6 determines whether the designation data DA3 designating protection of data DA2 in the memory unit 8 is written to the memory unit 8.

If the designation data DA3 designating protection is written to the memory unit 8, a process advances to step F4.

If the designation data DA3 designating protection is not written to the memory unit 8, the NFC controller 6 updates data DA2 in the memory unit 8 in step F3.

In step F4, the NFC controller 6 passes through the write instruction and the data DA1 to the memory controller 7.

In step F5, the NFC controller 6 writes the data DA1 to the nonvolatile semiconductor memory 5.

Figure 12:
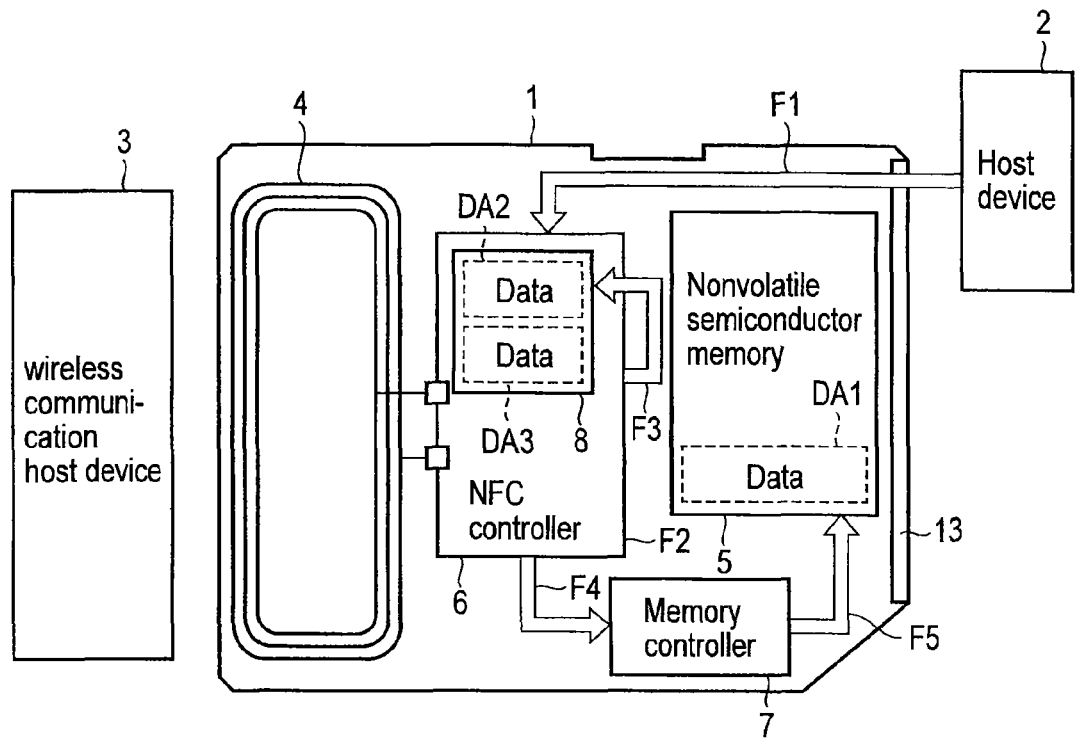
FIG. 12 is an exemplary block diagram showing an operation in which the NFC controller determines whether to protect data written to the memory unit.
Figure 13:
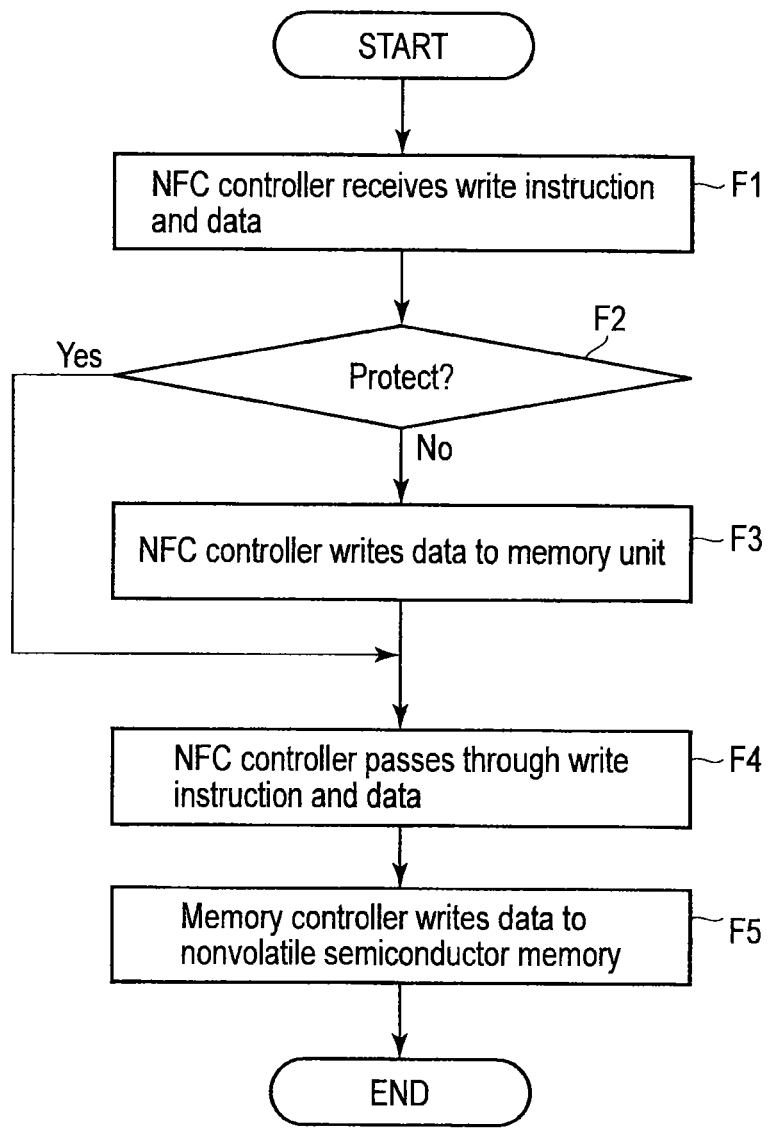
FIG. 13 is an exemplary flowchart showing the operation in which the NFC controller determines whether to protect the data written to the memory unit.

By applying this operation shown in FIGS. 12 and 13, the user can write his or her favorite image data to the memory unit 8 of the memory device 1 via NFC, and can also designate protection of the data. Accordingly, the user can share this favorite image data with his or her friend by holding the memory device 1 over the wireless communication host device 3 of the friend.

The memory device 1 according to this embodiment explained above includes a data write/read function like that of a memory card, and also includes an NFC function. Even when the host device 2 supplies no electric power, therefore, the memory device 1 can receive data from the wireless communication host device 3, or transmit data to the wireless communication host device 3.

In this embodiment, by electric power produced by the electromagnetic induction of the wireless antenna 4, the NFC controller 6 transmits the data DA2 stored in the memory unit 8, and the wireless communication host device 3 receives the data DA2. Accordingly, the user can check various kinds of information pertaining to the memory device 1 by only holding the memory device 1 close to the wireless communication host device 3, without setting the memory device 1 in the host device 2. By using the memory device 1 according to this embodiment, the user can provide favorite data to the wireless communication host device 3 of another person even in an environment such as a travel destination or business trip destination where the host device 2 such as a personal computer is not available.

In this embodiment, the data DA2 which the user wants to write to the memory unit 8 can explicitly be designated to the memory device 1 by using the designation data DA3, and the data DA2 designated by the designation data DA3 can be transmitted from the memory device 1 to the wireless communication host device 3.

An application example of the memory device 1 according to this example will briefly be explained below. Details of this application example will be explained in the second embodiment.

The NFC controller 6 of the memory device 1 according to this embodiment may receive, from the wireless communication host device 3, the data DA2 indicating a prohibition of reading or writing of the data DA1 written to the nonvolatile semiconductor memory 5, and write the data DA2 to the memory unit 8. The NFC controller 6 may also receive the data DA2 indicating a cancellation of read or write prohibition from the wireless communication host device 3, and write the data DA2 to the memory unit 8. Consequently, the user can easily switch the read prohibition and permission, and the write prohibition and permission of the data DA1 written to the nonvolatile semiconductor memory 5 by only holding the memory device 1 over the wireless communication host device 3.

The NFC controller 6 of the memory device 1 according to this embodiment may receive, from the wireless communication host device 3, the data DA2 for setting a wireless local area network (LAN) as a wireless communication service of an information communication terminal, and write the data DA2 to the memory unit 8. Thus, the user can easily write complicated setting to the memory device 1, and can transmit the data DA2 from the memory device 1 to the information communication terminal and set the information communication terminal based on the data DA2 by only holding the memory device 1 over the information communication terminal.

When the host device 2 supplies electric power to the memory device 1 according to this embodiment, the NFC controller 6 may read the data DA1 from the nonvolatile semiconductor memory 5, and transmit the data DA1 to the wireless communication host device 3 via the wireless antenna 4. Accordingly, the wireless communication host device 3 can read data from the memory device 1 via NFC while the memory device 1 is mounted to the host device 2.

The NFC controller 6 of the memory device 1 according to this embodiment can receive a compression program or various kinds of firmware from the wireless communication host device 3, write them to the memory unit 8, and execute them.

The NFC controller 6 of the memory device 1 according to this embodiment may receive, from the wireless communication host device 3, a uniform resource locator (URL) of a cloud service to which the NFC controller 6 intends to upload the data DA1 written to the nonvolatile semiconductor memory 5, and writes this URL to the memory unit 8. Consequently, the user can give the URL to the cell phone as an example of the wireless communication host device 3 by holding the memory device 1 over the cell phone, and can also read the data DA1 from the nonvolatile semiconductor memory 5 by mounting the memory device 1 to the cell phone, and upload the data DA1 to a site indicated by the URL.

The NFC controller 6 of the memory device 1 according to this embodiment may receive a user ID and password from the wireless communication host device 3, and write the user ID and password to the memory unit 8. Accordingly, the user can give the user ID and password to, for example, the cell phone by holding the memory device 1 over the cell phone, and use the cell phone based on the user ID and password.

Second Embodiment

In this embodiment, a modification of the memory device 1 according to the above-mentioned first embodiment and application examples of the modification will be explained. Note that this embodiment will be explained by taking an example in which the memory device 1 is a memory card. As described previously, however, the memory device 1 may also be the other form of a semiconductor memory device or semiconductor memory medium such as a USB memory, or memory system.

FIG. 14 is an exemplary block diagram showing an outline of an arrangement of a memory card according to this embodiment.

A memory card 10 includes the nonvolatile semiconductor memory 5, the wireless antenna 4, a controller 11, and the connecting unit 13. The controller 11 includes an SD processor 12, the NFC controller 6, and the memory controller 7.

The SD processor 12 transmits or receives data to or from a host device 2 in accordance with an SD standard.

FIG. 15 is a view showing a first application example of the memory card 10.

When the memory card 10 is held over the wireless communication host device 3 as the cell phone, particularly, a smartphone, thumbnail data, a file count, an imaging location/imaging time, a remaining memory amount, and a file name list stored in the memory unit 8 of the memory card 10 are transmitted to the wireless communication host device 3. The wireless communication host device 3 displays the thumbnail data, file count, imaging location/imaging time, remaining memory amount, and file name list. The file name list can be a list of image files or document files. Of image data written to the nonvolatile semiconductor memory 5, the memory card 10 transmits the thumbnail data of some last images (for example, eight to ten images) to the wireless communication host device 3. Also, the wireless communication host device 3 can transmit memo data formed by the user to the memory card 10, and the memory card 10 can write the memo data to the memory unit 8.

FIG. 16 is a view showing a second application example of the memory card 10.

When the memory card 10 is held over the wireless communication host device 3 such as the cell phone, the memory card 10 transmits image data written to the memory unit 8 to the wireless communication host device 3. In the second application example, the memory card 10 need not receive any electric power supply from another device. The image data can also be compressed into a predetermined size of about 30 Kbytes. The wireless communication host device 3 can immediately mail the image data received from the memory card 10 by NFC, and can easily upload the image data to a social networking service (SNS).

Figure 17:
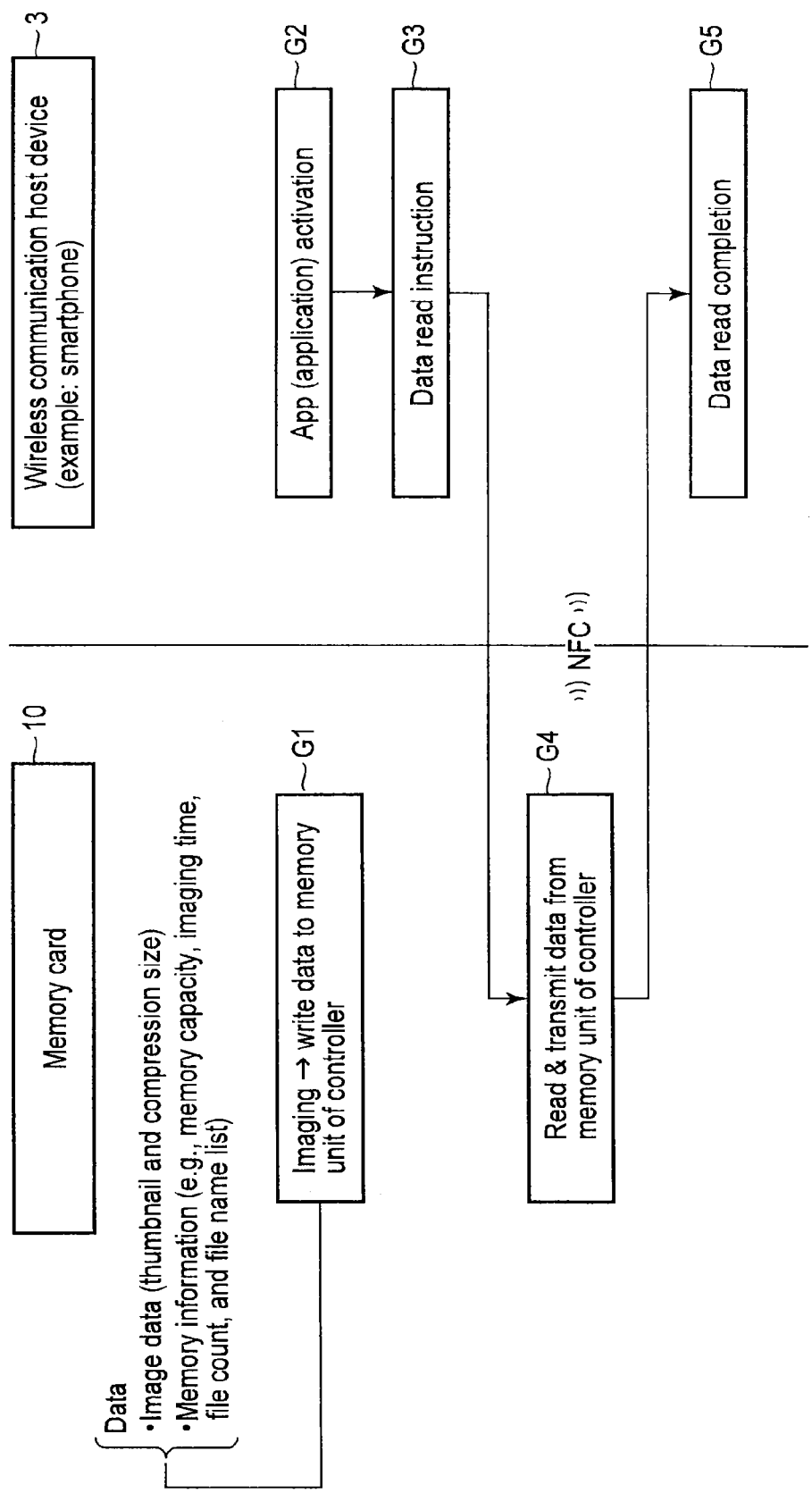
FIG. 17 is a flowchart showing a third application example of the memory card according to the second embodiment.

FIGS. 17 and 18 are respectively a flowchart and block diagram showing a third application example of the memory card 10.

In step G1, the memory card 10 writes image data obtained by the host device 2 as a camera to the nonvolatile semiconductor memory 5 via the SD processor 12 and memory controller 7. In addition, the NFC controller 6 of the memory card 10 acquires a part of the image data written to the nonvolatile semiconductor memory 5 and memory information of the nonvolatile semiconductor memory 5 via the memory controller 7, and writes a part of the image data and the memory information to the memory unit 8.

The wireless communication host device 3 such as the cell phone activates an application in step G2, and transmits the read instruction to the memory card 10 in step G3.

In step G4, the memory card 10 reads data from the memory unit 8 of the controller 11, and transmits the read data to the wireless communication host device 3.

In step G5, the wireless communication host device 3 receives the data, completes the read, and displays the read data.

This allows the user to readily check the data written to the memory card 10 by only holding the memory card 10 over the wireless communication host device 3.

FIG. 19 is a flowchart showing a fourth application example of the memory card 10.

The controller 11 of the memory card 10 writes identification data and an activation instruction of a specific application to the memory unit 8 in advance.

In step H1, the wireless communication host device 3 transmits a read instruction to the memory card 10.

In step H2, the memory card 10 reads the identification data and activation instruction of the application from the memory unit 8 of the controller 11, and transmits the identification data and activation instruction to the wireless communication host device 3.

In step H3, the wireless communication host device 3 recognizes the identification data and activation instruction of the application, and activates the application. Note that it is also possible to manually perform the application activation instruction.

Consequently, the user can activate the application of the wireless communication host device 3 by only holding the memory card 10 over the wireless communication host device 3 such as the cell phone.

Figure 20:
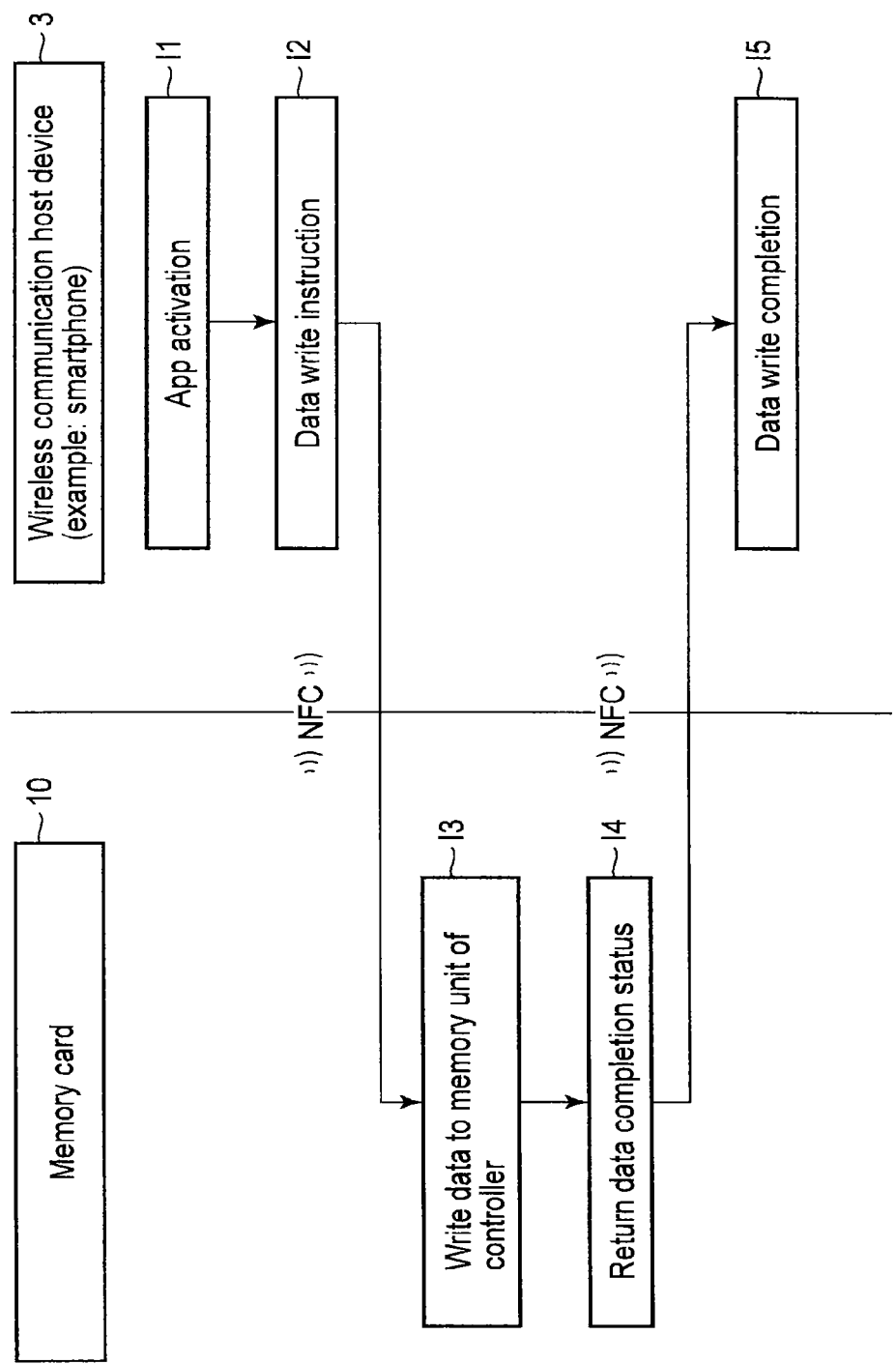
FIG. 20 is a flowchart showing a fifth application example of the memory card according to the second embodiment.
Figure 21:
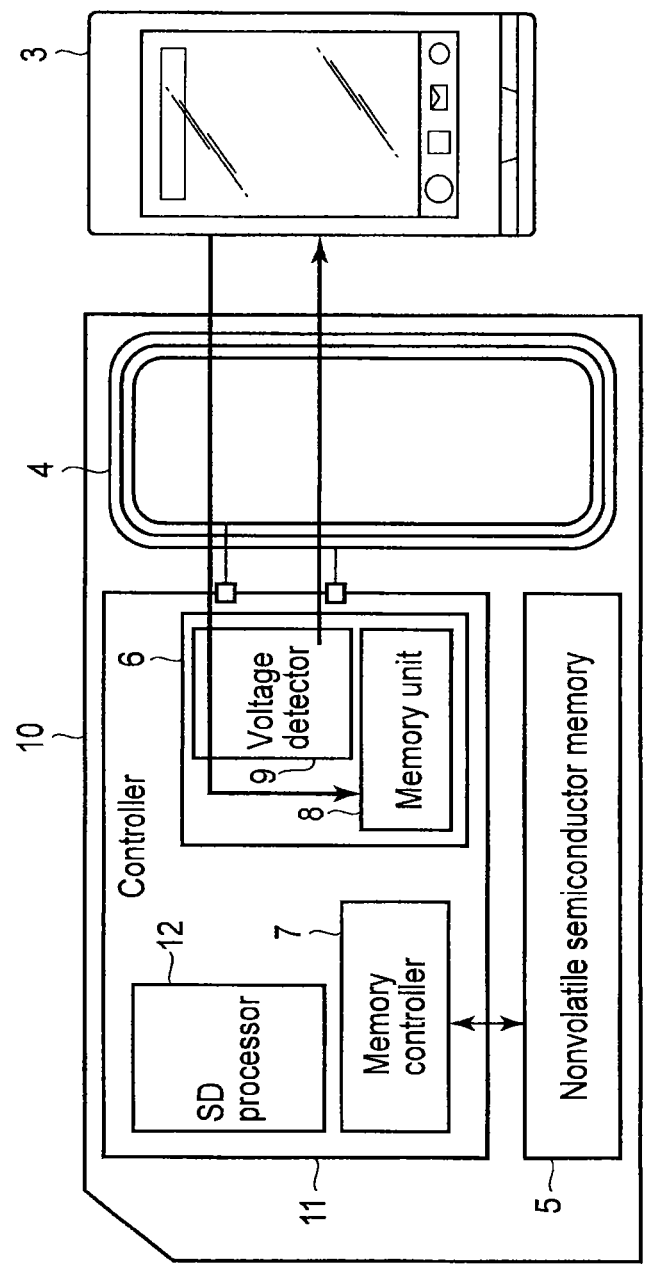
FIG. 21 is a block diagram showing the fifth application example of the memory card according to the second embodiment.

FIGS. 20 and 21 are respectively a flowchart and block diagram showing a fifth application example of the memory card 10.

When the memory card 10 is only held over the wireless communication host device 3, the controller 11 of the memory card 10 can receive memo data from the wireless communication host device 3, and write the memo data to the memory unit 8. The memo data includes, for example, an arbitrary title designated by the user, and a memo.

In step I1, the wireless communication host device 3 activates an application.

In step I2, the wireless communication host device 3 transmits memo data and a write instruction from the application to the memory card 10.

In step I3, the memory card 10 writes the memo data to the memory unit 8 of the controller 11.

In step I4, the memory card 10 transmits a data completion status indicating a completion of writing of the memo data to the wireless communication host device 3.

In step I5, the wireless communication host device 3 receives the data completion status, and completes the writing of the memo data.

Accordingly, the user can easily give, by using NFC, the memory card 10 the memo data indicating what data is written to the memory unit 8 of the memory card 10.

FIG. 22 is a view showing a sixth application example of the memory card 10.

The memory card 10 is mounted to the host device 2 such as a camera, and receives electric power supply from the host device 2. In this case, the controller 11 of the memory card 10 reads data from the nonvolatile semiconductor memory 5, and transmits the data to the wireless communication host device 3 such as a cell phone or printer by NFC. Thus, large-volume data can be transmitted from the memory card 10 to the wireless communication host device 3 by NFC.

Figure 23:
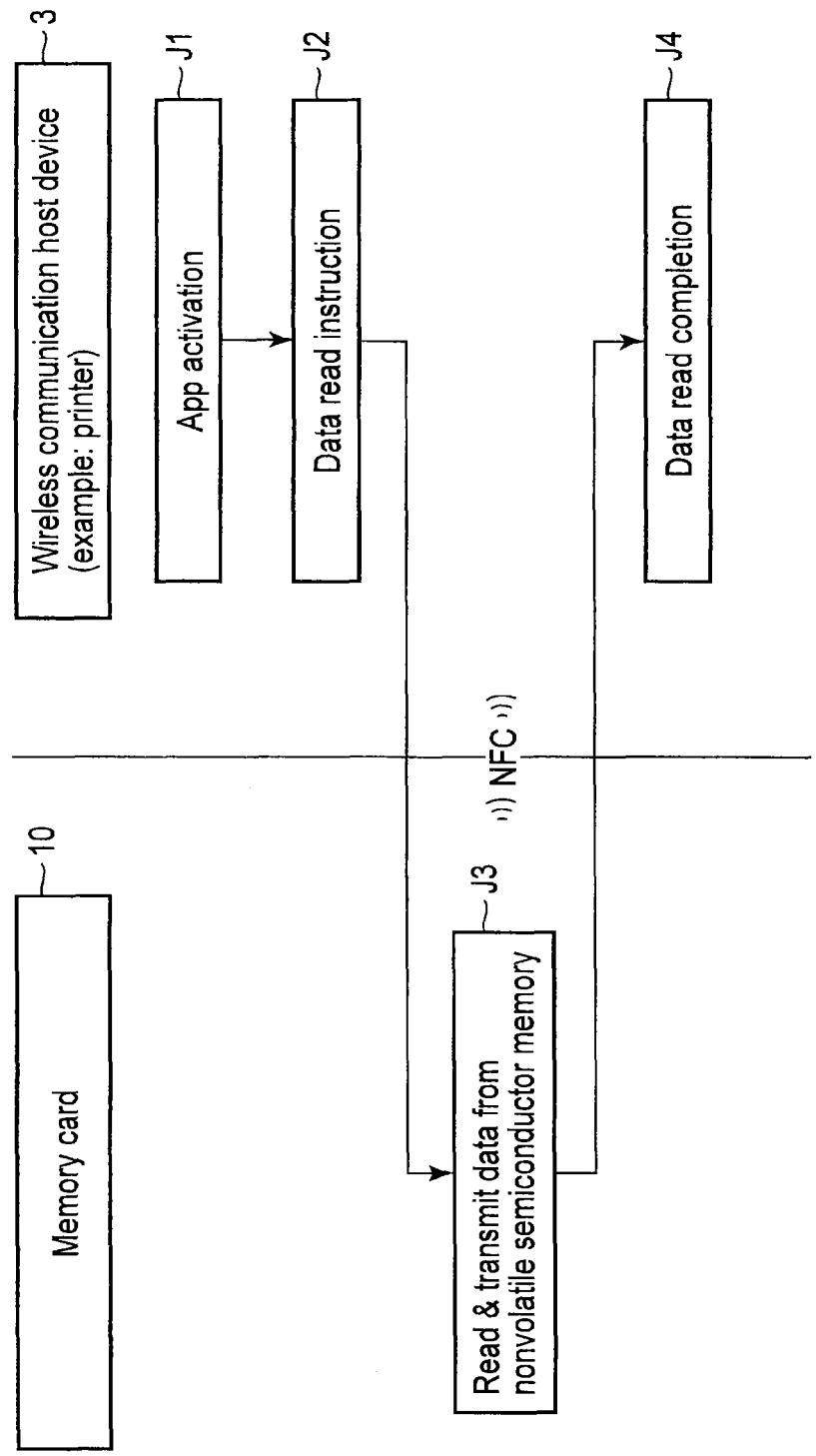
FIG. 23 is a flowchart showing a seventh application example of the memory card according to the second embodiment.
Figure 24:
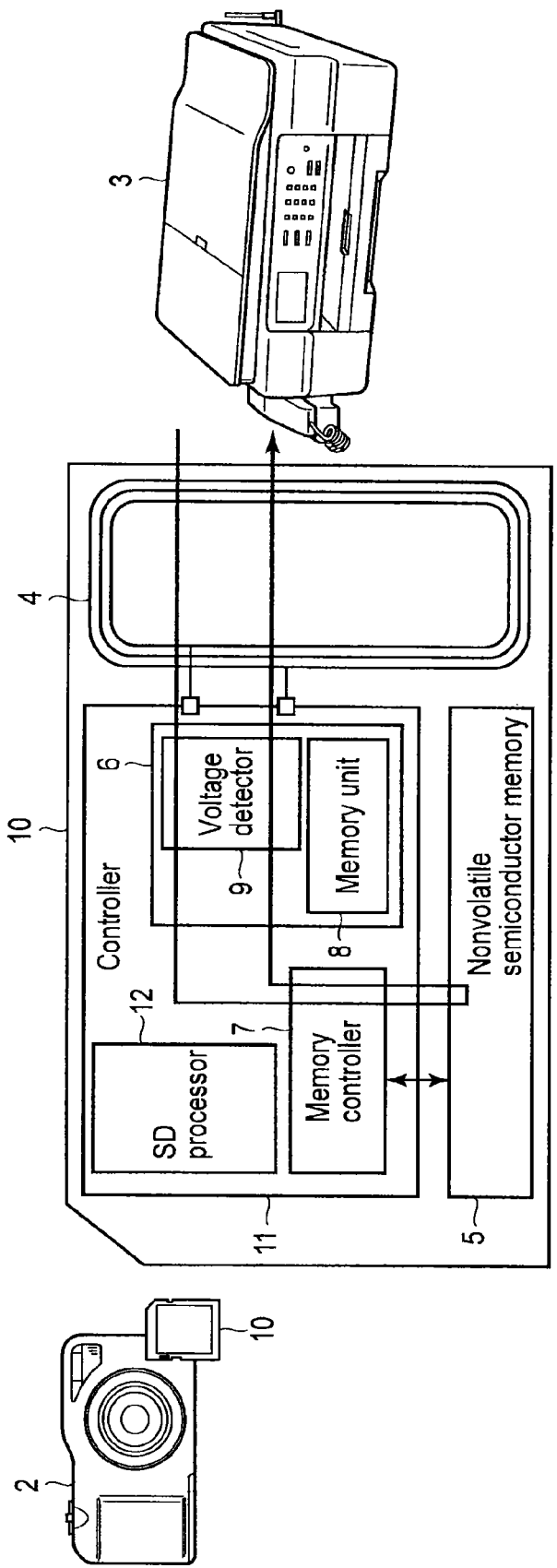
FIG. 24 is a block diagram showing the seventh application example of the memory card according to the second embodiment.

FIGS. 23 and 24 are respectively a flowchart and block diagram showing a seventh application example of the memory card 10.

The memory card 10 is mounted to the host device 2 such as a camera, and receives electric power supply from the host device 2.

In step J1, the wireless communication host device 3 such as a printer activates an application.

In step J2, the wireless communication host device 3 transmits a read instruction to the memory card 10.

In step J3, the controller 11 of the memory card 10 reads data from the nonvolatile semiconductor memory 5, and transmits the read data to the wireless communication host device 3 by NFC.

In step J4, the wireless communication host device 3 receives the data and completes reading.

In the seventh application example, large-volume data can be exchanged between the memory card 10 and wireless communication host device 3 by NFC.

Figure 25:
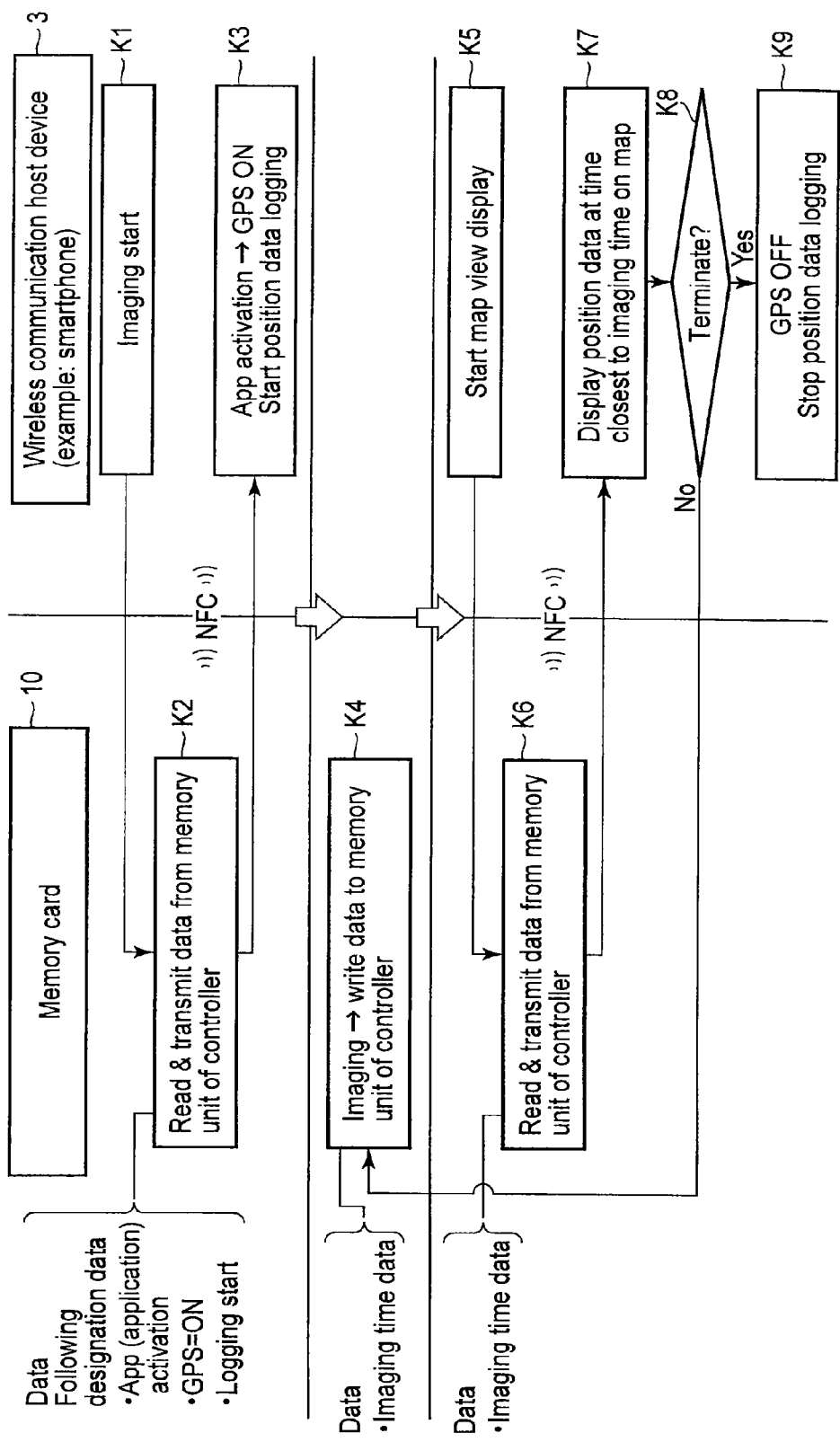
FIG. 25 is a flowchart showing an eighth application example of the memory card according to the second embodiment.

FIGS. 25 and 26 are respectively a flowchart and block diagram showing an eighth application example of the memory card 10.

The memory card 10 and wireless communication host device 3 cooperate with each other, and realize a map review display of a location where image data is obtained.

The controller 11 of the memory card 10 writes an activation instruction of an application, an instruction to turn on a GPS, and a position data logging instruction to the memory unit 8.

In step K1, the wireless communication host device 3 transmits an imaging start to the memory card 10 by NFC.

In step K2, when receiving the imaging start, the memory card 10 reads data written to the memory unit 8, and transmits the read data to the wireless communication host device 3 by NFC.

In step K3, based on the data received from the memory card 10, the wireless communication host device 3 activates the application, turns on the GPS, starts logging the position data, and stores GPS position data and time by associating them with each other.

Note that it is also possible to manually designate the activation of the application, the turning on of the GPS, and the position data logging start.

In step K4, when imaging is performed, the memory card 10 writes the image data to the nonvolatile semiconductor memory 5, and writes imaging time data to the memory unit 8 of the controller 6.

In step K5, the wireless communication host device 3 transmits a map view display start instruction to the memory card 10 by NFC.

In step K6, the memory card 10 reads the imaging time data from the memory unit 8 of the controller 11, and transmits the imaging time data to the wireless communication host device 3 by NFC.

In step K7, the memory card 10 receives the imaging time data from the wireless communication host device 3, and displays position data corresponding to a time closest to a time indicated by the imaging time data on a map. This makes it possible to display a result obtained by linking the imaging time data and position data on the map.

In step K8, the wireless communication host device 3 determines whether to terminate a process. If the process is not to be terminated, the process advances to step K4.

If the process is to be terminated, the wireless communication host device 3 terminates the application, turns off the GPS, and stops the logging the position data. Note that the wireless communication host device 3 may also transmit a process termination to the memory card 10 by NFC.

Accordingly, even when the memory card 10 is mounted to the host device 2 including no Global Positioning System (GPS) function, for example, a camera, the user can see the map review display of the imaging location on the wireless communication host device 3.

Figure 27:
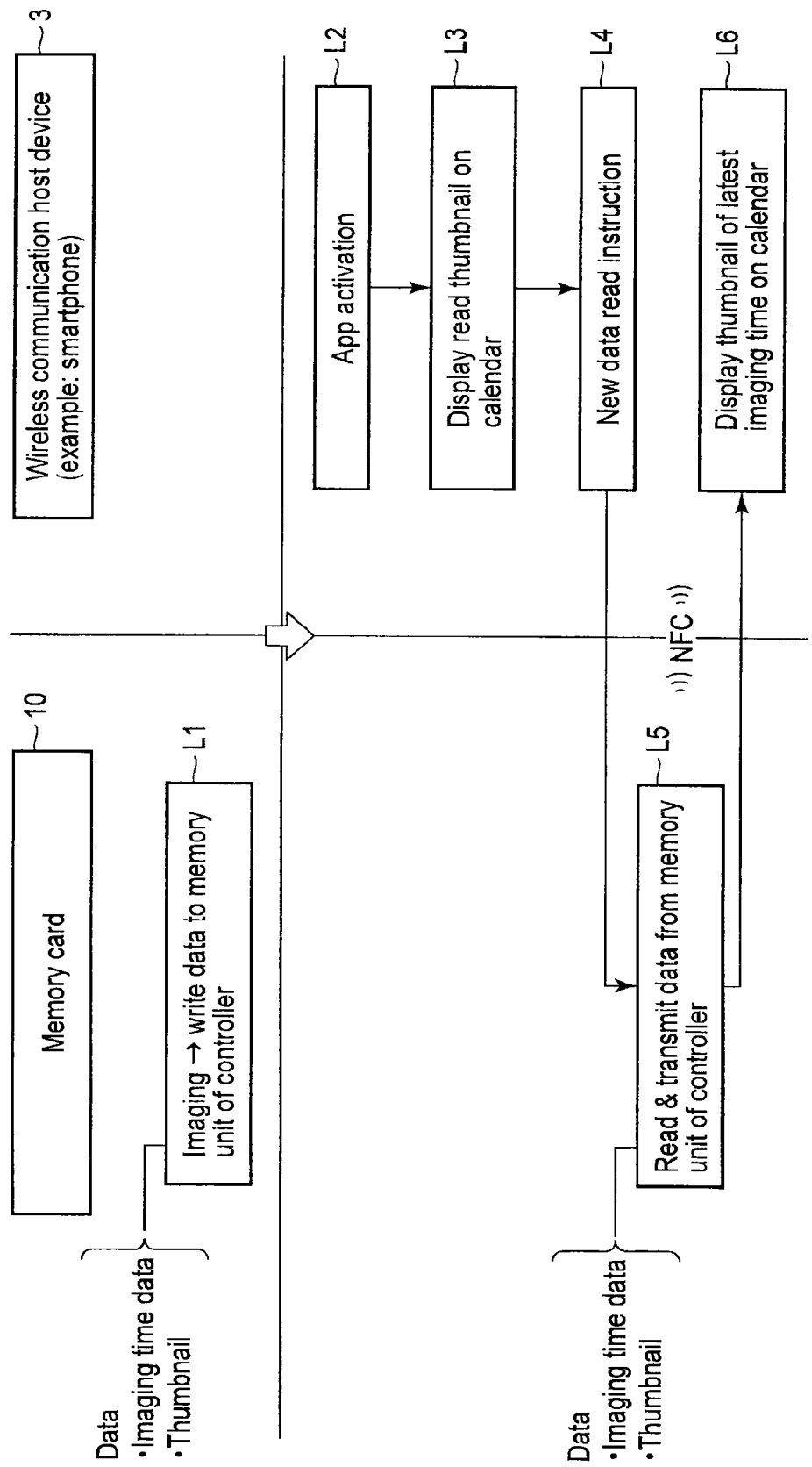
FIG. 27 is a flowchart showing a ninth application example of the memory card according to the second embodiment.

FIGS. 27 and 28 are respectively a flowchart and block diagram showing a ninth application example of the memory card 10.

The memory card 10 and the wireless communication host device 3 such as a cell phone cooperate with each other, and the wireless communication host device 3 additionally displays an imaging event on a calendar.

In step L1, the memory card 10 writes image data to the nonvolatile semiconductor memory 5, and writes data including imaging time data and thumbnail data to the memory unit 8. The thumbnail data may also be image data corresponding to all images, one or a plurality of images per day, the last image, or a plurality of last images. The thumbnail data may also be written to the memory unit 8 whenever imaging is performed.

In step L2, the wireless communication host device 3 activates an application. Note that the application may also be activated by holding the memory card 10 over the wireless communication host device 3.

In step L3, the wireless communication host device 3 displays read thumbnail data on a calendar.

In step L4, the wireless communication host device 3 transmits a new data read instruction to the memory card 10.

In step L5, the memory card 10 reads data written to the memory unit 8, and transmits the read data to the wireless communication host device 3 by NFC.

In step L6, based on the data from the memory card 10, the wireless communication host device 3 displays the latest thumbnail data on the date/time, which is indicated by the latest imaging time data, of the calendar.

Thus, when the memory card 10 is only held over the wireless communication host device 3, the wireless communication host device 3 can paste image data, which is written to the memory card 10, in that position of the calendar which corresponds to the imaging day.

Figure 29:
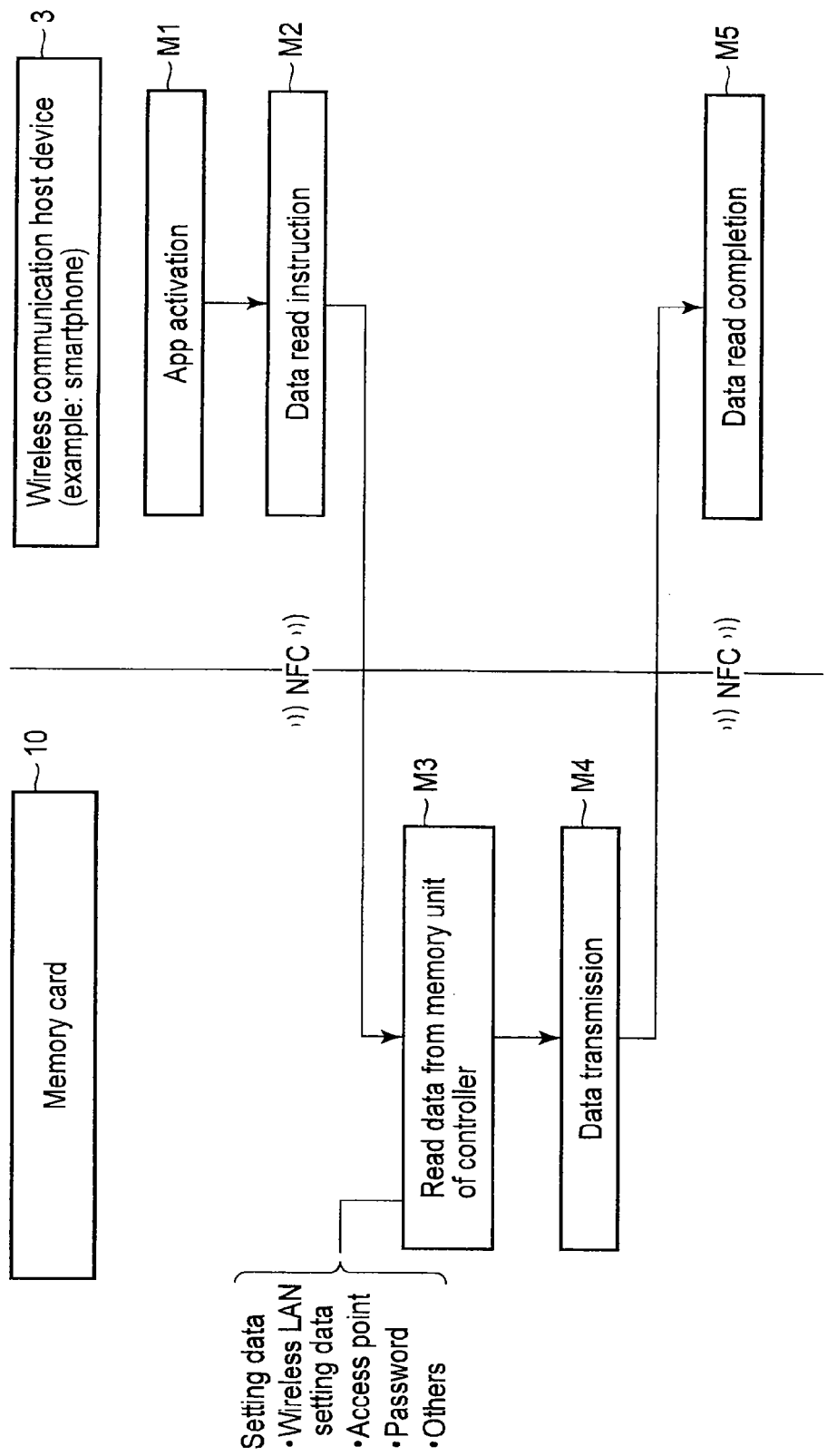
FIG. 29 is a flowchart showing a tenth application example of the memory card according to the second embodiment.
Figure 30:
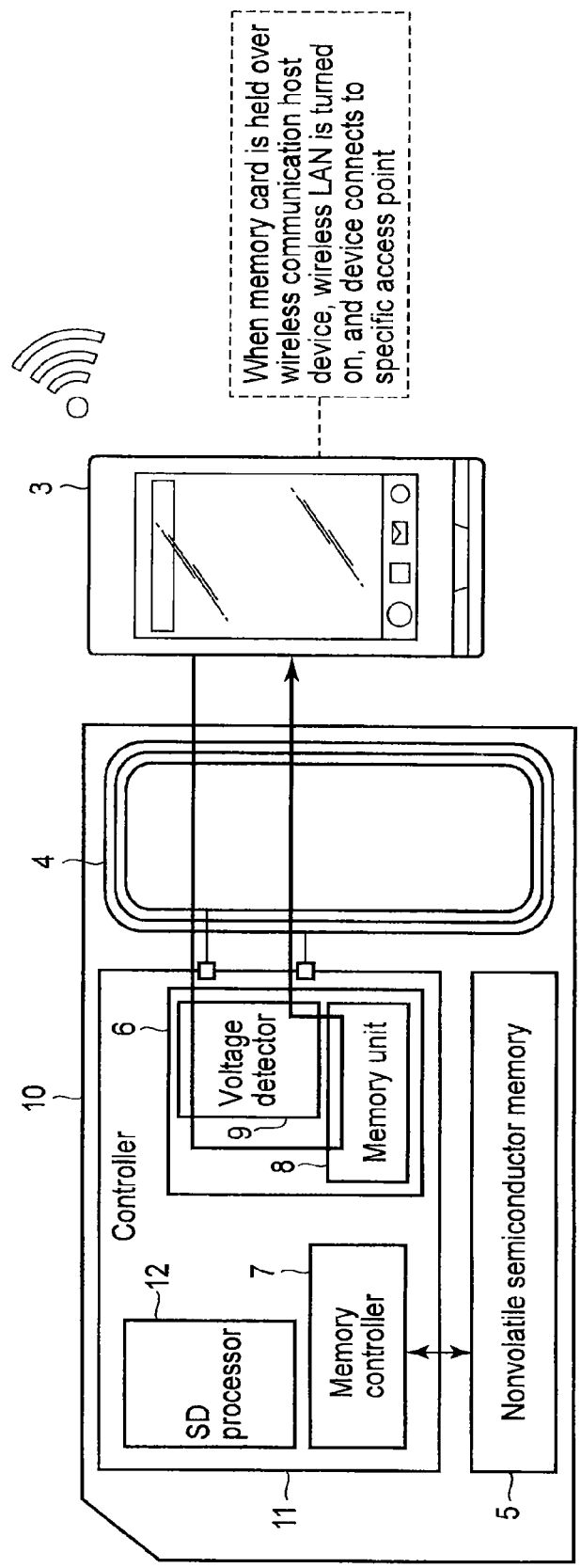
FIG. 30 is a block diagram showing the tenth application example of the memory card according to the second embodiment.

FIGS. 29 and 30 are respectively a flowchart and block diagram showing a tenth application example of the memory card 10.

In the tenth application example, the memory card 10 transmits wireless LAN setting data to the wireless communication host device 3 by NFC, and the wireless communication host device 3 sets a wireless LAN based on the setting data.

Setting data including setting data for the wireless LAN such as Wi-Fi (Wireless Fidelity), an access point (SSID), and a password is written to the memory unit 8 of the memory card 10.

In step M1, the wireless communication host device 3 activates an application.

In step M2, the wireless communication host device 3 transmits a read instruction to the memory card 10 by NFC.

In step M3, the memory card 10 reads the setting data written to the memory unit 8 in response to the read instruction.

In step M4, the memory card 10 transmits the setting data to the wireless communication host device 3 by NFC.

In step M5, the wireless communication host device 3 receives the setting data from the memory card 10, completes reading, and sets the wireless LAN based on the setting data.

Consequently, when the memory card 10 is only held over the wireless communication host device 3, the wireless communication host device 3 can set the wireless LAN and connect to a specific access point.

FIG. 31 is a flowchart showing an eleventh application example of the memory card 10. In the eleventh application example, the host device 2 such as a personal computer uploads data to a server that provides a cloud service, and the wireless communication host device 3 such as a cell phone accesses the data on the server.

In step N1, the host device 2 transmits a read instruction to the memory card 10.

In step N2, in response to the read instruction, the memory card 10 reads data from the nonvolatile semiconductor memory 5, and transmits the read data to the host device 2.

In step N3, the host device 2 receives the data, and uploads the data to the server that provides the cloud service.

In step N4, the host device 2 transmits a write instruction and access destination data including, for example, a URL, access point, and password to the memory card 10.

In step N5, the memory card 10 writes the access destination data to the memory unit 8, and transmits a write completion to the host device 2.

In step N6, the memory card 10 receives the write completion from the host device 2, and terminates the process.

In step N7, the wireless communication host device 3 activates an application.

In step N8, the wireless communication host device 3 transmits an access destination data read instruction to the memory card 10 by NFC.

In step N9, the memory card 10 reads the access destination data from the memory unit 8, and transmits the read access destination data to the wireless communication host device 3 by NFC.

In step N10, the wireless communication host device 3 accesses the cloud service provided by the server based on the access destination data.

By holding the memory card 10 over the wireless communication host device 3, therefore, the user can readily use the cloud service and browse uploaded data by using the wireless communication host device 3.

FIG. 32 is a flowchart showing a twelfth application example of the memory card 10. FIG. 32 shows a process of canceling a security of the memory card 10.

In step O1, the wireless communication host device 3 activates an application.

In step O2, the wireless communication host device 3 transmits a security cancellation instruction to the memory card 10 by NFC.

In step O3, the memory card 10 turns off a security flag in the memory unit 8 of the controller 11.

In step O4, the memory card 10 transmits a data completion status indicating a completion of a turning-off of the security flag to the wireless communication host device 3.

In step O5, the wireless communication host device 3 receives the data completion status from the memory card 10, and completes the security cancellation.

In step O6, the host device 2 transmits a read instruction to the memory card 10.

In step O7, the memory card 10 determines whether the security flag written to the memory unit 8 of the controller 11 is OFF.

If the security flag is OFF, the process advances to step O8, and the memory card 10 reads data from the nonvolatile semiconductor memory 5, and transmits the read data to the host device 2.

If the security flag is not OFF, the process advances to step O9, and the memory card 10 transmits a security locked status indicating that the security is locked to the host device 2.

In step O10, the host device 2 receives the data or security locked status, and completes reading.

Thus, the user can readily cancel the security of the memory card 10 by only holding the memory card 10 over the wireless communication host device 3.

Figure 33:
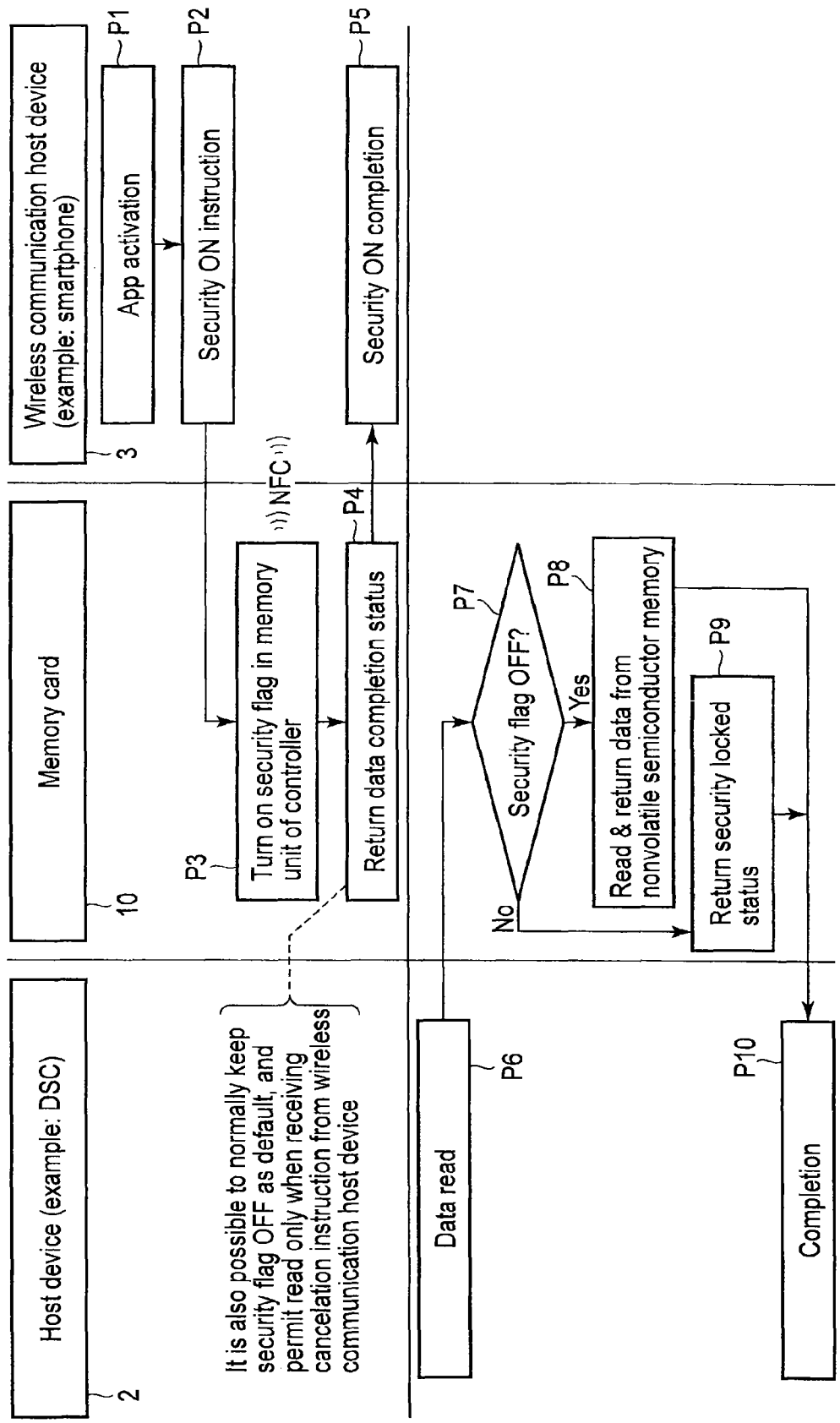
FIG. 33 is a flowchart showing a thirteenth application example of the memory card according to the second embodiment.

FIG. 33 is a flowchart showing a thirteenth application example of the memory card 10. FIG. 33 shows a process of turning on the security of the memory card 10.

In step P1, the wireless communication host device 3 activates an application.

In step P2, the wireless communication host device 3 transmits a security ON instruction to the memory card 10 by NFC.

In step P3, the memory card 10 turns on the security flag in the memory unit 8 of the controller 11.

In step P4, the memory card 10 transmits a data completion status indicating a completion of the turning-on of the security flag to the wireless communication host device 3 by NFC.

In step P5, the wireless communication host device 3 receives the data completion status from the memory card 10, and completes the security ON.

Steps P6 to P10 are the same as steps O6 to O10 shown in FIG. 32 described above.

Thus, the user can readily turn on the security of the memory card 10 by only holding the memory card 10 over the wireless communication host device 3.

Note that read from the host device 2 to the memory card 10 has been explained in FIGS. 32 and 33 described above, but restriction and cancellation can be performed for read from the wireless communication host device 3 to the memory card 10 as well.

Furthermore, restriction and cancellation can be performed not only for read from the memory card 10 but also for write to the memory card 10.

Figure 34:
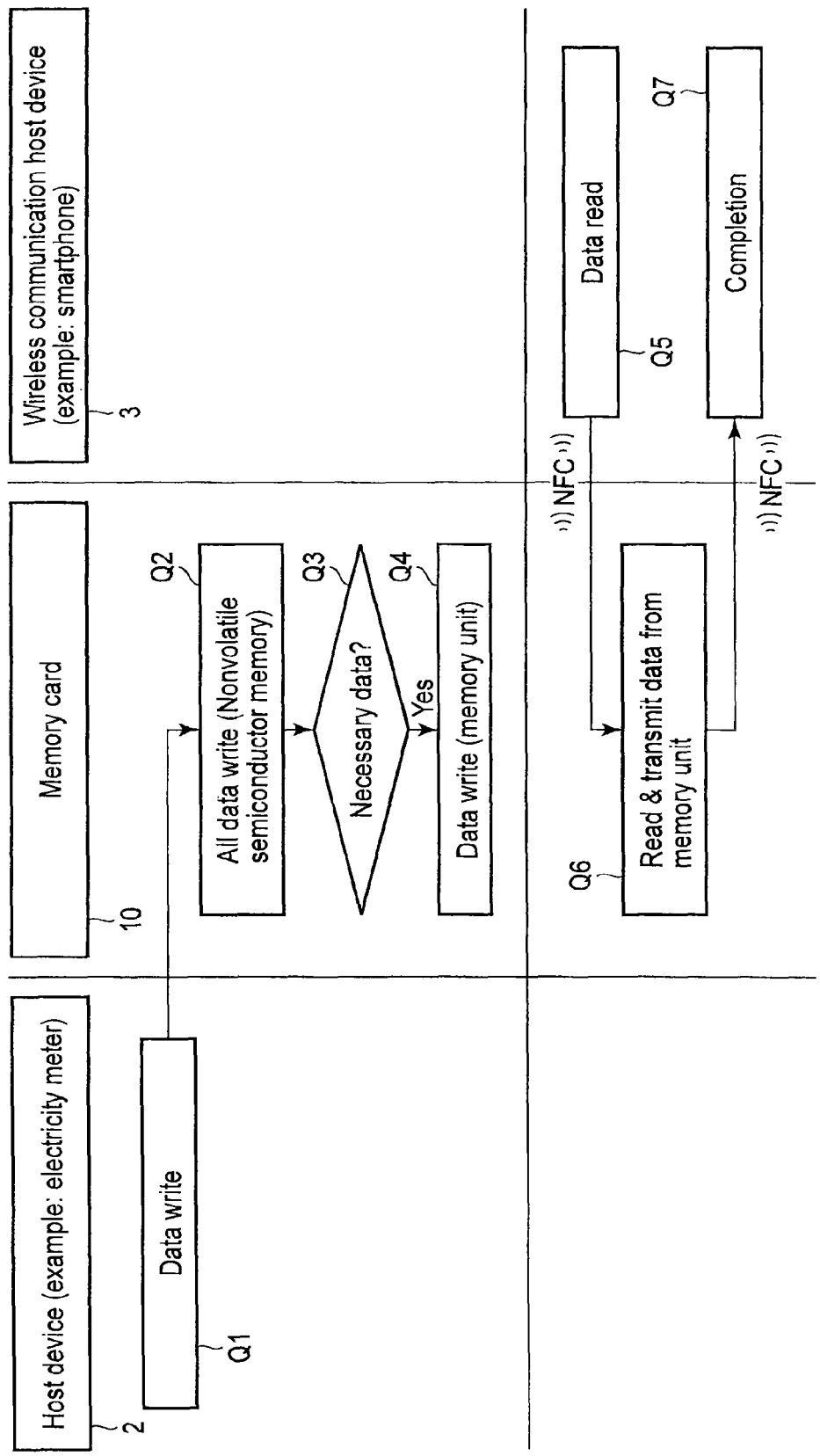
FIG. 34 is a flowchart showing a fourteenth application example of the memory card according to the second embodiment.

FIG. 34 is a flowchart showing a fourteenth application example of the memory card 10.

In the fourteenth application example, the host device 2 is an electricity meter.

In step Q1, the host device 2 transmits observation data of the electricity meter and a write instruction to the memory card 10.

In step Q2, the memory card 10 writes all observation data to the nonvolatile semiconductor memory 5.

In step Q3, the memory card 10 determines necessary data among all observation data. The necessary data is, for example, data in a predetermined period, data of a month, or electric power consumption per day. The necessary data may also be designated by the above-described designation data.

In step Q4, the memory card 10 writes the necessary data to the memory unit 8.

In step Q5, the wireless communication host device 3 such as a cell phone transmits a necessary data read instruction to the memory card 10 by NFC.

In step Q6, based on the read instruction, the memory card 10 reads the necessary data from the memory unit 8, and transmits the read necessary data to the wireless communication host device 3 by NFC.

In step Q7, the wireless communication host device 3 receives the necessary data and completes a process.

In the fourteenth application example, the host device 2 automatically writes the observation data to the memory card 10. In the fourteenth application example, the user can check the observation data such as energy consumption without forming any network environment. In the fourteenth application example, when the wireless communication host device 3 such as a cell phone is only held over the memory card 10 mounted to the host device 2, the wireless communication host device 3 can easily collect the necessary data. Power saving can be realized by mounting the memory card 10 to the host device 2, and collecting and checking the necessary data by the wireless communication host device 3.

Figure 35:
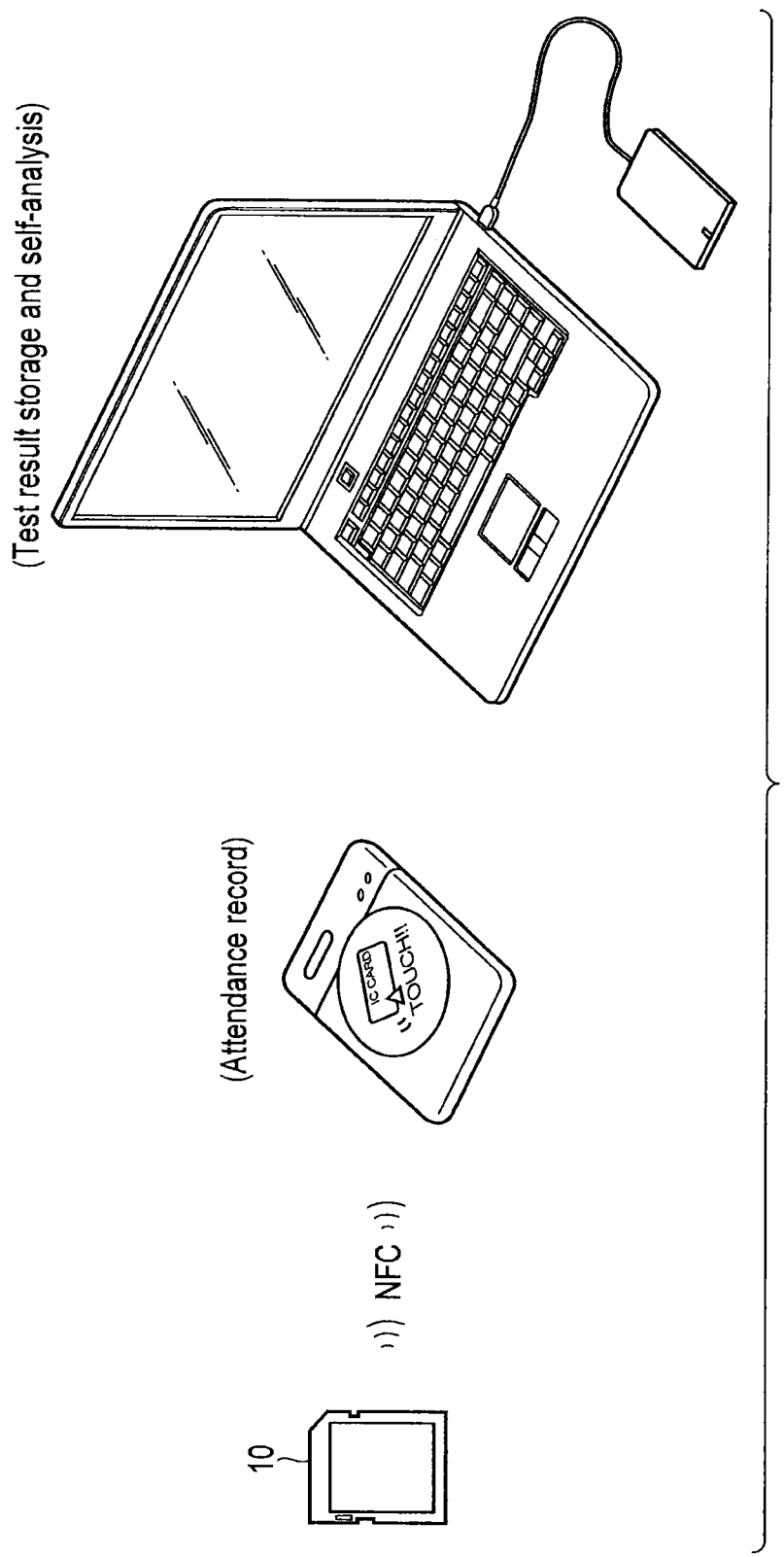
FIG. 35 is a view showing a fifteenth application example of the memory card according to the second embodiment.

FIG. 35 is a view showing a fifteenth application example of the memory card 10.

An educational institution can distribute teaching material data by writing it to the memory card 10. In addition, it is possible to write student IDs to the memory unit 8 of the memory card 10, and record attendance by holding the memory card 10 over the wireless communication host device 3 as a reader for checking attendance. It is also possible to write suggested answer data to the memory unit 8 of the memory card 10. Test result data may also be written to the memory unit 8 of the memory card 10. A student can check a test result by holding his or her cell phone as the wireless communication host device 3 over the memory card 10, and can analyze a weak point or a tendency by using an application of the cell phone. This makes it possible to improve a convenience of the memory card 10 in the educational institution.

FIG. 36 is a flowchart showing a sixteenth application example of the memory card 10.

In the sixteenth application example, the host device 2 is a game apparatus, the wireless communication host device 3 is a game apparatus, and the two game apparatuses exchange data via the memory card 10. Examples of the data exchanged between the game apparatuses are a character ID and game save data.

In step R1, the wireless communication host device 3 transmits data and a write instruction to the memory card 10 by NFC.

In step R2, the memory card 10 writes the data to the memory unit 8 of the controller 11, and transmits a write completion to the wireless communication host device 3.

In step R3, the wireless communication host device 3 receives the write completion.

In step R4, the host device 2 transmits a read instruction to the memory card 10.

In step R5, the memory card 10 reads the data from the memory unit 8 of the controller 11, and transmits the read data to the host device 2.

In step R6, the host device 2 receives the data and completes the read.

In step R7, the host device 2 transmits data and a write instruction to the memory card 10.

In step R8, the memory card 10 writes the data to the memory unit 8 of the controller 11, and transmits a write completion to the host device 2.

In step R9, the host device 2 receives the write completion.

In step R10, the wireless communication host device 3 transmits a read instruction to the memory card 10.

In step R11, the memory card 10 reads the data from the memory unit 8 of the controller 11, and transmits the read data to the wireless communication host device 3.

In step R12, the wireless communication host device 3 receives the data and completes the read.

In the sixteenth application example, the game apparatuses can readily exchange data by using the memory card 10.

As has been explained above, the memory card 10 according to this embodiment is usable in various forms, and capable of reading data from the wireless communication host device 3 by NFC, thereby improving the user-friendliness.

For example, to manage image data saved in a normal memory card by using a host device (for example, a personal computer), the user may copy the image data in the memory card to a memory device (for example, a hard disk) of the host device. In this case, to overcome a capacity shortage in the memory device of the host device, the user must delete the image data from the memory device of the host device. Also, the user must move the data at the time of exchanging the host device, and thus much effort is required. As the number of pixels of image data increases, the volume of the image data increases. If the host device is a tablet computer, it may be hard to secure a save location of the image data.

On the other hand, if the memory card 10 according to the present embodiment is used, the user can readily check memory contents of the memory card 10 with the wireless communication host device 3 by bringing the memory card 10 close to the wireless communication host device 3, and can readily manage image data while the image data is stored in the memory card 10. This allows the management effort of the user to be reduced. For example, the user can reduce the effort of deleting image data from the wireless communication host device 3, and can prevent an increase in the volume of data in the memory device provided in the wireless communication host device 3. Also, in the present embodiment, if the wireless communication host device is a tablet computer, the necessity for a large memory area for saving image data can be avoided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a memory;
   a first controller configured to control the memory;
   a wireless antenna;
   a memory unit configured to be capable of operating by the wireless antenna; and
   a second controller configured to be capable of operating by the wireless antenna, read data from the memory unit when receiving a read instruction, and output the data using the wireless antenna,
   wherein the second controller comprises a voltage detector electrically connected to the wireless antenna, and outputs the data using the wireless antenna based on a detection result of the voltage detector.

2. The memory device according to claim 1, wherein the wireless antenna and the second controller perform communication complying with a near field communication standard.

3. The memory device according to claim 1, wherein the memory unit and the second controller receive power generated by the wireless antenna when wireless communicating.

4. The memory device according to claim 1, wherein
   the second controller outputs a write instruction and first data to the first controller when receiving the write instruction and the first data from a host device, and
   the first controller writes the first data to the memory, and a second data to the memory unit when receiving the write instruction and the first data from the second controller.

5. The memory device according to claim 1, wherein
   the second controller outputs a write instruction and first data to the first controller and writes second data to the memory unit when receiving the write instruction and the first data from a host device, and
   the first controller writes the first data to the memory when receiving the write instruction and the first data from the second controller.

6. The memory device according to claim 1, wherein the second controller writes the data to the memory unit when receiving a write instruction and the data using the wireless antenna.

7. The memory device according to claim 1, wherein the second controller incorporates the memory unit.

8. The memory device according to claim 1, wherein the memory and the first controller are capable of electrically connecting to a host device, and operate by power supplied from the host device.

9. The memory device according to claim 1, wherein when receiving power supply from a host device and receiving a wireless output instruction, the second controller reads output data from the memory, and outputs the output data using the wireless antenna.

10. The memory device according to claim 1, wherein the data includes at least one of a portion of a first data written to the memory, management information of the first data, a memory capacity of the memory, a remaining capacity of the memory, a file name of the first data, production time data of the first data, and memo data concerning the first data.

11. The memory device according to claim 1, wherein
    the second controller writes instruction data to the memory unit when receiving the instruction data and a write instruction using the wireless antenna, and
    the second controller performs a process indicated by the instruction data written to the memory unit when receiving a performing instruction.

12. A memory device comprising:
    a connecting unit electrically connectable to a first host device;
    a memory configured to operate on electric power which is supplied from the first host device via the connecting unit;
    a first controller configured to operate on the electric power which is supplied from the first host device via the connecting unit, and control the memory;
    a wireless antenna configured to produce electric power based on a radio wave from a second host device;
    a memory unit configured to operate on the produced electric power, and
    a second controller configured to operate on the produced electric power, read data from the memory unit when receiving a read instruction via the wireless antenna, and output the data using the wireless antenna.

13. The memory device according to claim 12, wherein the wireless antenna and the second controller perform communication with the second host device complying with a near field communication standard.

14. The memory device according to claim 12, wherein the connecting unit is an SD interface.

15. The memory device according to claim 12, wherein
    the second controller outputs a write instruction and first data to the first controller and writes second data to the memory unit when receiving the write instruction and the first data from the first host device, and
    the first controller writes the first data to the memory when receiving the write instruction and the first data from the second controller.

16. The memory device according to claim 12, wherein the second controller incorporates the memory unit.

17. The memory device according to claim 12, wherein the data includes at least one of a portion of a first data written to the memory, management information of the first data, a memory capacity of the memory, a remaining capacity of the memory, a file name of the first data, production time data of the first data, and memo data concerning the first data.

18. An information processing system comprising:
    a first host device; and
    a memory device, wherein
    the memory device includes:
    a connecting unit electrically connectable to the first host device;
    a memory configured to operate on electric power which is supplied from the first host device via the connecting unit;

a first controller configured to operate on the electric power which is supplied from the first host device via the connecting unit, and control the memory;

a wireless antenna configured to produce electric power based on a radio wave from a second host device;

a memory unit configured to operate on the produced electric power, and a second controller configured to operate on the produced electric power, read data from the memory unit when receiving a read instruction via the wireless antenna, and output the data using the wireless antenna, and wherein the wireless antenna and the second controller perform communication with the second host device complying with a near field communication standard.

19. The information processing system according to claim 18, wherein the second controller outputs a write instruction and first data to the first controller and writes second data to the memory unit when receiving the write instruction and the first data from the first host device, and the first controller writes the first data to the memory when receiving the write instruction and the first data from the second controller.

20. The information processing system according to claim 18, wherein the second controller incorporates the memory unit.

* * * * *